(12) United States Patent
Hoenke et al.

(10) Patent No.: US 8,757,218 B2
(45) Date of Patent: Jun. 24, 2014

(54) MODULAR TIRE INFLATOR

(75) Inventors: Mark S. Hoenke, Grand Rapids, MI (US); Timothy J. Leep, Zeeland, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 23 days.

(21) Appl. No.: 13/335,033

(22) Filed: Dec. 22, 2011

(65) Prior Publication Data

US 2012/0325366 A1    Dec. 27, 2012

Related U.S. Application Data

(63) Continuation of application No. 12/331,661, filed on Dec. 10, 2008, now Pat. No. 8,096,328.

(60) Provisional application No. 61/012,599, filed on Dec. 10, 2007.

(51) Int. Cl.
*B65B 31/00* (2006.01)

(52) U.S. Cl.
USPC .................. 141/4; 141/38; 141/95; 141/129; 141/153; 141/197; 157/1.1

(58) Field of Classification Search
USPC ............. 141/38, 95, 197–198, 269–284, 129, 141/153; 157/1, 1.1, 1.11, 1.33; 152/415
See application file for complete search history.

(56) References Cited

U.S. PATENT DOCUMENTS

| | | | |
|---|---|---|---|
| 2,810,432 | A | 10/1957 | Schreiner |
| 2,900,015 | A | 8/1959 | Harrison |
| 3,461,938 | A | 8/1969 | Mueller |
| 3,741,271 | A | 6/1973 | Ross et al. |

(Continued)

FOREIGN PATENT DOCUMENTS

| | | |
|---|---|---|
| DE | 1912722 | 12/1970 |
| DE | 3423307 A1 | 1/1986 |

(Continued)

OTHER PUBLICATIONS

Extended European Search Report completed Dec. 16, 2011, from corresponding European Application No. EP 08839820.1.

(Continued)

*Primary Examiner* — Timothy L Maust
*Assistant Examiner* — Timothy P Kelly
(74) *Attorney, Agent, or Firm* — Gardner, Linn, Burkhart & Flory, LLP

(57) ABSTRACT

A tire inflation system comprising a tire inflation apparatus having an inflation head, a pressurized gas source, and a controller, with the inflation head being positioned at a tire and wheel assembly inflation location at which a tire and wheel assembly is received to inflate the tire and wheel assembly. The tire and wheel assembly includes a tire pressure monitoring (TPM) valve stem that detects and transmits inflation pressure data of the tire and wheel assembly. The inflation head defines a tire inflation cavity that seals with the tire of the tire and wheel assembly when engaged with the inflation head. Pressurized gas is delivered from the pressurized gas source through an outlet in the tire inflation cavity for inflation of the tire and wheel assembly. The controller receives inflation pressure data from the TPM valve stem and controls operation of the tire inflation apparatus in response thereto.

15 Claims, 16 Drawing Sheets

(56) References Cited

U.S. PATENT DOCUMENTS

| | | |
|---|---|---|
| 3,774,664 A | 11/1973 | Matysak |
| 3,978,903 A | 9/1976 | Mueller et al. |
| 4,183,392 A | 1/1980 | Kane |
| 4,735,250 A | 4/1988 | Kane |
| 4,834,159 A | 5/1989 | Burger |
| 4,947,919 A | 8/1990 | Timlin |
| 5,035,274 A | 7/1991 | Kinnick et al. |
| 5,072,765 A | 12/1991 | Kane et al. |
| 5,146,969 A | 9/1992 | Kawabe et al. |
| 5,170,828 A | 12/1992 | Curcuri |
| 5,657,673 A | 8/1997 | Fukamachi et al. |
| 5,758,703 A | 6/1998 | Mimura |
| 5,826,319 A | 10/1998 | Colwell et al. |
| 5,876,501 A | 3/1999 | Doan |
| 5,940,960 A | 8/1999 | Doan et al. |
| 5,980,083 A | 11/1999 | Patte et al. |
| 6,029,716 A | 2/2000 | Hawk |
| 6,076,586 A | 6/2000 | Hans |
| 6,119,814 A | 9/2000 | Kane et al. |
| 6,148,892 A | 11/2000 | Koerner et al. |
| 6,176,288 B1 | 1/2001 | Kane et al. |
| 6,209,684 B1 | 4/2001 | Kane et al. |
| 6,463,982 B1 | 10/2002 | Doan |
| 6,467,524 B2 | 10/2002 | Ronge et al. |
| 6,502,618 B1 | 1/2003 | Kane et al. |
| 6,918,423 B2 | 7/2005 | Pellerin et al. |
| 7,044,188 B2 | 5/2006 | Pullerin et al. |
| RE39,312 E | 10/2006 | Kane et al. |
| 7,430,900 B2 * | 10/2008 | Belanger ............... 73/146 |
| 7,506,671 B2 | 3/2009 | Peinelt et al. |
| 2006/0136288 A1 | 6/2006 | Peinelt et al. |

FOREIGN PATENT DOCUMENTS

| | | |
|---|---|---|
| DE | 102005045169 A1 | 3/2007 |
| EP | 1110765 A2 | 6/2001 |
| EP | 1671820 A2 | 6/2006 |
| FR | 2794088 | 12/2000 |
| JP | 1032908 | 2/1989 |
| JP | 6144165 | 5/1994 |
| JP | 11105515 | 4/1999 |
| JP | 2005-238876 | 2/2004 |
| JP | 2006-326492 | 5/2005 |

OTHER PUBLICATIONS

Sparton Allied Automation Systems brochure regarding Allied Uniseal Inflator, 1981.

TruMack Assembly, L.L.C., Tire & Wheel Mounting, Inflating & Balancing System AIM Job #99-T037, AIM Automotive Integrated Manufacturing, Sep. 15, 1999.

International Search Report for corresponding International Application No. PCT/US2008/086191, Apr. 30, 2009.

Written Opinion of the International Searching Authority for corresponding International Application No. PCT/US2008/086191, Apr. 30, 2009.

* cited by examiner

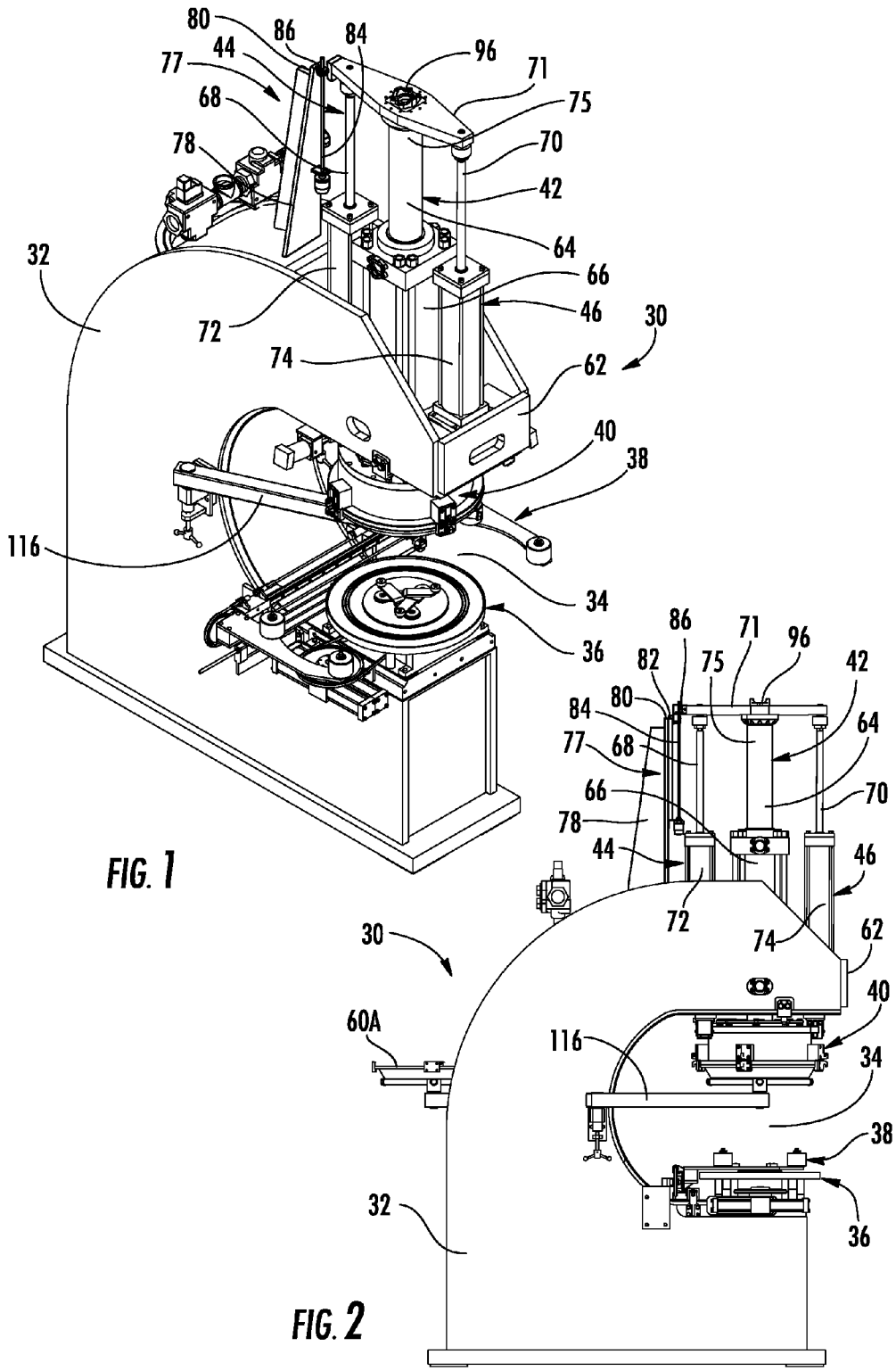

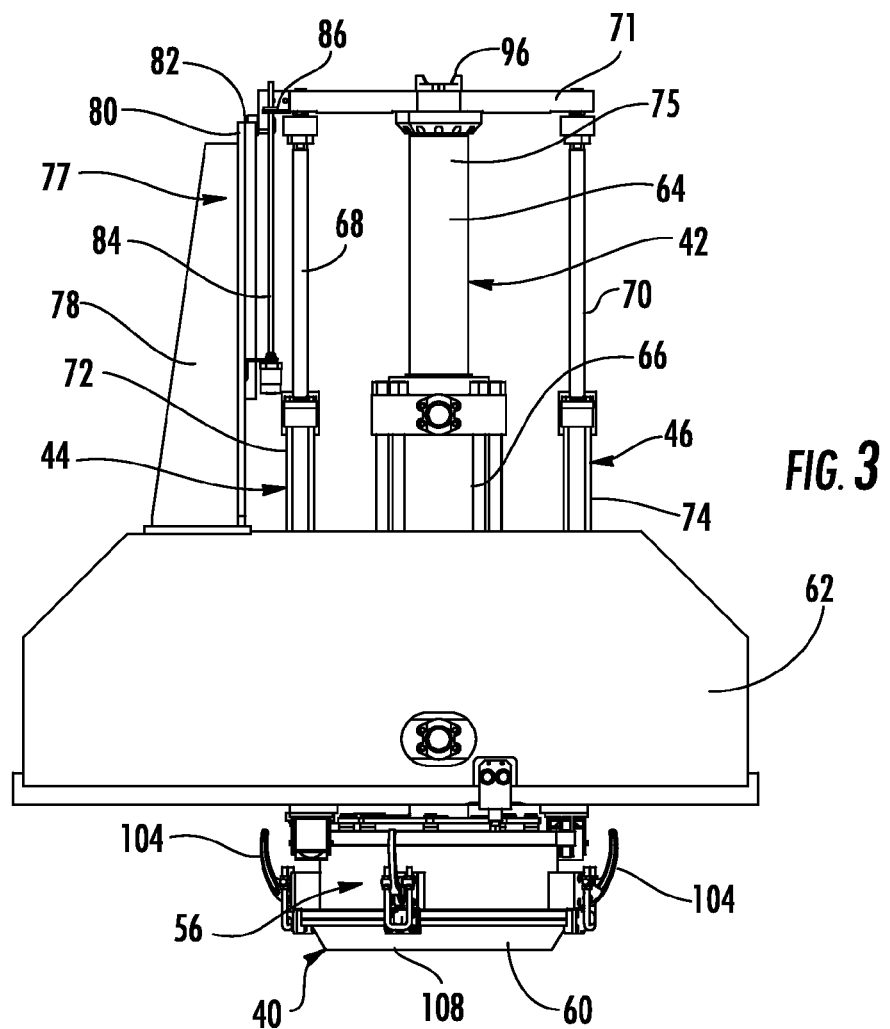
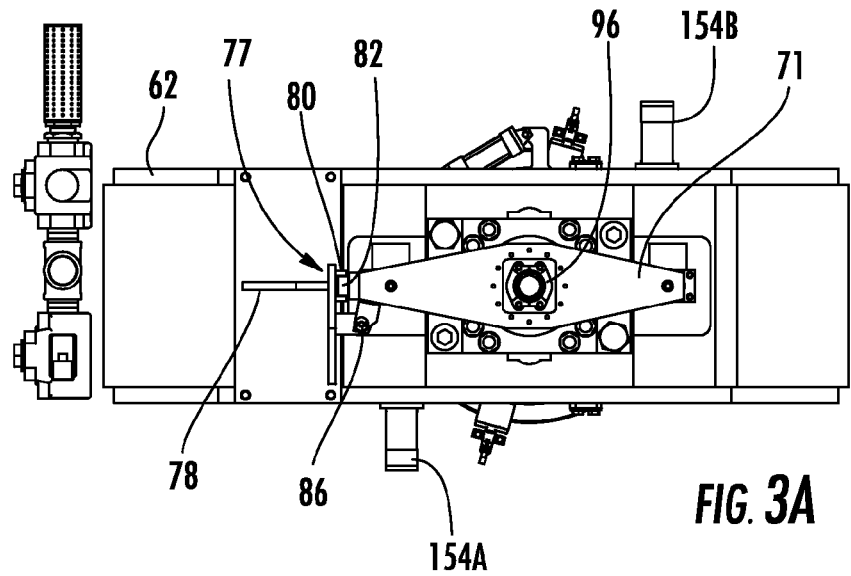

MODULAR TIRE INFLATOR

CROSS REFERENCE TO RELATED APPLICATION

The present application is a continuation of U.S. application Ser. No. 12/331,661, filed Dec. 10, 2008, which claims priority of U.S. provisional application Ser. No. 61/012,599 filed Dec. 10, 2007, by Hoenke for MODULAR TIRE INFLATOR which are both hereby incorporated herein by reference in their entireties.

BACKGROUND AND TECHNICAL FIELD OF THE INVENTION

The present invention is directed to an apparatus and method for inflating a tire assembled to a wheel.

Tire inflators are used in the mass assembly of tire and wheel rims to expedite inflation of the tire relative to inflating through the tire valve. Tire inflators traditionally include a portion that moves relative to the tire and wheel assembly for contacting and maintaining a sidewall of the tire in an orientation deflected from the wheel rim during the inflation of the tire. The moveable portion of the tire inflator is typically moved in a vertical direction as guided by guide rods or the like extending downwardly and between the moveable portion and a stationary portion adjacent the tire and wheel rim assembly. Large volumes of pressurized air are delivered to the assembly from one side or the other of the tire and wheel assembly. That is, pressurized air may be delivered through the side contacted by the moveable portion of the tire inflator or may be delivered from a bottom area opposite the moveable portion of the tire inflator. Tire inflation apparatuses may include mechanisms to adjust the machines to inflate variously sized tire and wheel combinations. Bellows or air cylinders may be used on such apparatuses to drive the mechanisms that adjust the machines.

Debris, such as tire debris, poor lubrication, or alignment errors causing the moveable portion to tilt or become misaligned on the guide rods, however, are problematic to such systems in that the moveable portion may bind. Thus, the timing operation of the tire inflator may be disrupted and/or damage to the guide rods, moveable portion, and/or tire and wheel assembly may result. Still further, debris can cause problems to systems that inflate from beneath a tire and wheel assembly as a result of the debris clogging valves and seals. The use of bellows increases the overall moving mass and height requirement of tire inflators and may require the travel distance of the movable portion to increase. This increase in height and moving mass, thus, can increase the cycle time and power requirements of inflation apparatuses.

SUMMARY OF THE INVENTION

A tire inflation apparatus in accordance with the present invention positions a head position cylinder and assist cylinders used for imparting and guiding motion of an inflation head above the inflation head, and above the tire and wheel assembly to be inflated. Pressurized gas is delivered to the inflation head via a fluid passageway formed in the shaft of the head position cylinder. The inflation head may include both an inner and outer bell assembly, with the outer bell assembly being selectively attachable and detachable from the inner bell assembly. When detached from the inner bell assembly, the outer bell assembly may be retained or stored such that the inner bell assembly is able to move independently. Positioning of the inflation head may be controlled with a position sensor and a proportional position control, such as a proportional directional control valve, integrated with a control system for monitoring the location of the inflation head and controlling the flow of hydraulic fluid and/or compressed air to the head position cylinder and/or assist cylinders to direct movement of and position the inflation head.

According to an aspect of the present invention a tire inflation apparatus for inflating a tire mounted on a rim comprises a frame member positioned above a tire and rim assembly inflation location at which a tire mounted on a rim is received to inflate the tire and an inflation head movable between a retracted position and a tire engaging position, with the inflation head defining a tire inflation cavity and being adapted to form a seal with a tire when positioned against a tire in the tire engaging position where pressurized gas is deliverable into the inflation cavity to inflate a tire when the inflation head is sealed against a tire in the tire engaging position. The inflation apparatus further includes a head position cylinder including a fixed head position cylinder base and a moveable inflation shaft. The inflation head is mounted to the inflation shaft whereby movement of the inflation shaft selectively positions the inflation head between the retracted position and the tire engaging position. The inflation apparatus also includes a first assist cylinder mounted to the frame member above the inflation location, with the first assist cylinder including a fixed first assist cylinder base and a moveable first assist shaft. The first assist shaft is operatively connected to the inflation shaft by a moveable cross member with the head position cylinder and first assist cylinder cooperatively operating to selectively position the inflation head and the inflation head being positioned in the retracted position by vertical upward extension of the first assist shaft from the first assist cylinder base and positioned in the tire engaging position by vertical downward retraction of the first assist shaft into the first assist cylinder base.

A fluid passage may extend at least partially through the inflation shaft, with the fluid passage forming an outlet in the inflation cavity for the delivery of pressurized gas through the fluid passage into the inflation cavity. In an embodiment, the cross member is positioned and moveable vertically above the frame member, and the first assist cylinder base member and head position cylinder base are mounted to the frame member. Also in an embodiment, the inflation shaft includes a lower portion extending and retracting vertically downward from the head position cylinder base and an upper portion extending and retracting vertically upward from the head position cylinder base with the upper portion of the inflation shaft connected to the moveable cross member. The first assist cylinder may be a hydraulic or pneumatic cylinder.

According to another aspect of the present invention, a tire inflation apparatus for inflating a tire mounted on a rim comprises a frame member positioned above a tire and rim assembly inflation location at which a tire mounted on a rim is received to inflate the tire, at least one retainer mounted to the frame member, and an inflation head movable between a retracted position and a tire engaging position with the inflation head defining a tire inflation cavity and adapted to form a seal with a tire when positioned against a tire in the tire engaging position. The apparatus further includes a head position cylinder including a fixed head position cylinder base and a moveable inflation shaft, the inflation head being mounted to the inflation shaft whereby movement of the inflation shaft selectively positions the inflation head between the retracted position and the tire engaging position. The inflation shaft includes a fluid passage extending at least partially through the inflation shaft with the fluid passage forming an outlet in the inflation cavity such that pressurized gas is deliverable through the fluid passage to the inflation cavity to inflate a tire when the inflation head is sealed against a tire in the tire engaging position. The inflation head comprising an outer bell assembly and an inner bell assembly with the outer bell assembly being selectively attachable to the inner bell assembly with the outer bell assembly forming a seal with a tire when engaged with the inner bell assembly and the outer bell assembly being positioned against a tire in the tire engaging position. The outer bell assembly being selectively detachable from the inner bell assembly with the at least one retainer adapted to hold the outer bell assembly in the retracted position when the outer bell assembly is detached from the inner bell assembly. The inner bell assembly being selectively moved independently of the outer bell assembly when the outer bell assembly is detached from the inner bell assembly with the inner bell assembly forming a seal with a tire when disengaged from the outer bell assembly and the inner bell assembly is positioned against a tire.

In an embodiment the inner bell assembly includes a plurality of locking pins with the outer bell assembly including a moveable outer bell locking plate having a plurality of locking apertures for selectively receiving the locking pins. The outer bell locking plate being moveable to selectively engage the outer bell assembly with the inner bell assembly and enable the outer bell assembly to be disengaged from the inner bell assembly. The outer bell assembly may include a locking plate actuator adapted to rotate the outer bell locking plate relative to the inner bell assembly for engaging and disengaging the locking pins with the locking apertures. The outer bell assembly includes at least one tab and with the at least one retainer comprising a clamp adapted to engage the tab to hold the outer bell assembly in the retracted position when detached from the inner bell assembly. The clamp may be actuated by a retention cylinder.

According to another aspect of the present invention, a tire inflation apparatus for inflating a tire mounted on a rim comprises a frame member positioned above a tire and rim assembly inflation location at which a tire mounted on a rim is received to inflate the tire and an inflation head movable between a retracted position and a tire engaging position, with the inflation head defining a tire inflation cavity and adapted to form a seal with a tire when positioned against a tire. The inflation apparatus further includes a controller, a position gauge, a position control valve, and a head position cylinder. The head position cylinder includes a fixed head position cylinder base and a moveable inflation shaft with the inflation head mounted to the inflation shaft whereby movement of the inflation shaft selectively positions the inflation head between the retracted position and the tire engaging position. The position gauge operatively detects the position of the inflation head and the controller is operatively connected with the position gauge such that the controller receives position information of the inflation head. The position control valve is operatively connected with the controller and adapted to control movement of the inflation head, with the controller adapted to operate the position control valve to direct movement of the inflation head in response to position information of the inflation head received from the position gauge.

In an embodiment the tire inflation apparatus further includes a pressure transmitter operative to monitor pressure at the tire inflation cavity and transmit input signals indicative of the pressure to the controller, wherein the controller is adapted to operate the inflation apparatus in response to the input signals. Also in an embodiment the head position cylinder comprises a hydraulic cylinder and the inflation shaft includes a piston inside the head position cylinder base, wherein the position control valve comprises a hydraulic proportional flow control valve adapted to supply and remove hydraulic fluid from both sides of the piston. The controller may also receive data input signals comprising information indicative of a tire and wheel assembly to be inflated, with the controller operable to control operation of the inflation apparatus in response thereto.

Therefore, an inflation apparatus is provided that may conveniently deliver pressurized tire inflation fluid, such as compressed air, through a shaft of the head position cylinder, thereby simplifying the delivery of pressurized gas to a tire for inflation. Upwardly extending assist cylinders may be used to aid positioning an inflation head of the apparatus between a retracted and extended position such shafts of the assist cylinders are operated out of the tire and wheel assembly inflation location to avoid contamination. The inflation apparatus may also be provided with a guide system mounted above the inflation head and adjacent an assist cylinder and/or head position cylinder to guide movement of the inflation head above and away from the debris generating zone of the inflation apparatus. A position sensor, pressure transmitter, and a proportional position control valve integrated with a closed loop control system can be incorporated to monitor and control the position of the inflation head of the inflation apparatus. The inflation apparatus further enables differently sized wheel and tire combinations to be conveniently inflated without time consuming equipment changes.

These and other objects, advantages, purposes and features of this invention will become apparent upon review of the following specification in conjunction with the drawings.

BRIEF DESCRIPTION OF THE DRAWINGS

FIG. 1 is a perspective view of a tire inflation apparatus in accordance with the present invention;

FIG. 2 is a side elevation view of the tire inflation apparatus of FIG. 1;

FIG. 3 is a side elevation view of an upper portion of the tire inflation apparatus of FIG. 1 showing the inflation head in a retracted position;

FIG. 3A is a top plan view of the tire inflation apparatus portion of FIG. 3;

DESCRIPTION OF THE PREFERRED EMBODIMENTS

Figures 4, 5:
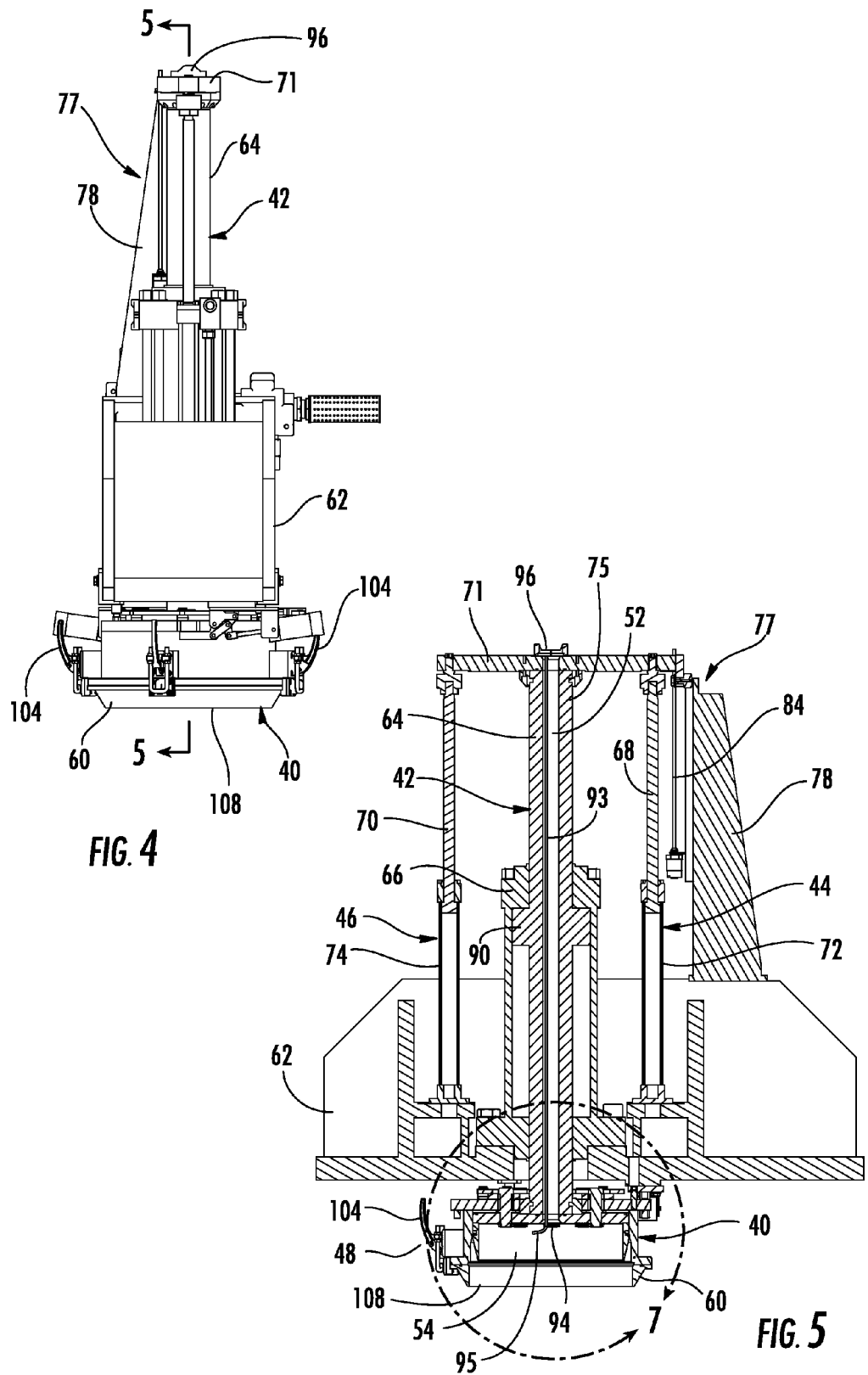
FIG. 4 is a front elevation view of the tire inflation apparatus portion of FIG. 3.
FIG. 5 is sectional view along the line A-A of FIG. 4.

The present invention will now be described with reference to the accompanying figures, wherein the numbered elements in the following written description correspond to like-numbered elements in the figures. A tire inflation apparatus 30 is shown in FIGS. 1 and 2 to include a base 32 having a wheel and tire assembly input location 34, a wheel centering apparatus 36, a tire centering apparatus 38, and an inflation head 40 mounted to an inflation head positioning cylinder or inflation head cylinder or head position cylinder or inflation cylinder 42. In the illustrated embodiment, inflation apparatus 30 also includes a pair of assist cylinders 44, 46 located on either side of the inflation cylinder 42. Inflation head 40 is used to inflate tires mounted to wheels or wheel rims, such as tire and wheel rim assembly 45 of FIG. 6 and tire and wheel rim assembly 47 of FIG. 6A. Inflation head 40 is caused to move between, and is retained in, a retracted or stored position 48 (FIG. 5) and a tire engaging position 50 (FIG. 6) by way of inflation cylinder 42 and assist cylinders 44, 46.

The positioning of inflation cylinder 42 and assist cylinders 44, 46 in an orientation above the assembly input location 34 aids in the proper operation of inflation apparatus 30 by avoiding or inhibiting assembly contamination or debris from damaging or causing binding of inflation cylinder 42 and assist cylinders 44, 46 by being mounted away from the debris generating zone associated with the tire and wheel assembly input location 34. Moreover, as described below, inflation cylinder 42 includes a fluid passage 52 (FIG. 5) enabling compressed gas to be delivered at least partially through the inflation cylinder 42 and into an inflation cavity 54 (FIG. 5) of the inflation head 40 for inflating the tire of a wheel and tire assembly 45 and 47.

As additionally described still further below, inflation head 40 includes both an outer bell assembly 56 and an inner bell assembly 58 to enable inflation of differently sized wheel and tire assemblies 45, 47 using inflation apparatus 30. Outer bell assembly 56 may be disconnected and retained such that inner bell assembly 58 is able to move between the retracted position 48 and tire engaging position 50 independently of outer bell assembly 56. Outer bell assembly 56 also includes a removable ring seal member 60 (FIGS. 3-7) that may be replaced with ring seal members of differing sizes to further enable inflation of differently sized wheel and tire assemblies using inflation apparatus 30.

Figure 6:
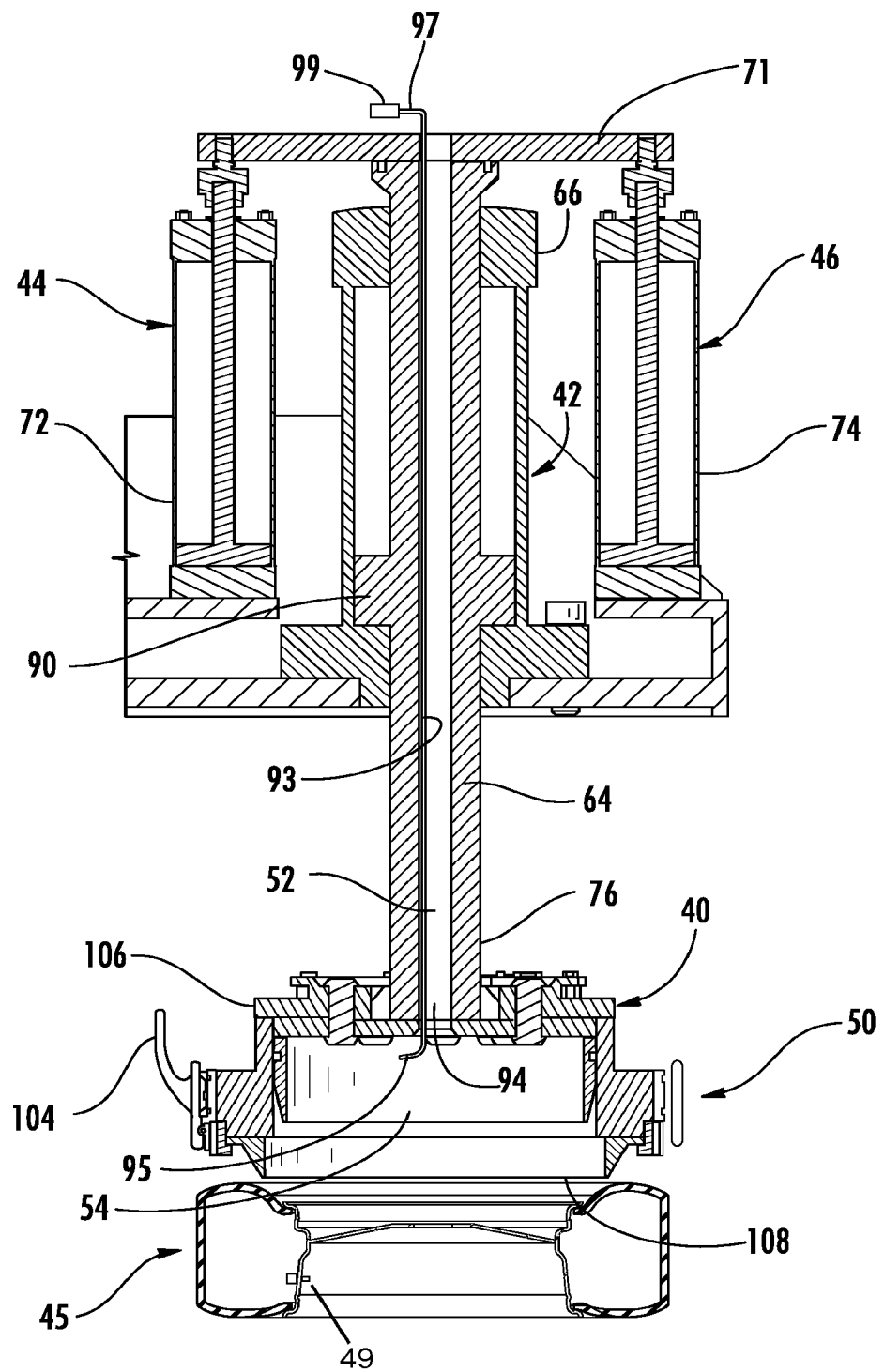
FIG. 6 is a side sectional view of an upper portion of the tire inflation apparatus of FIG. 1 showing the inflation head in a tire engaging position.

Referring now to FIGS. 3-7, inflation cylinder 42 and assist cylinders 44, 46 are mounted to a fixed frame member 62, which in the illustrated embodiment is attached to and forms part of base 32. Inflation cylinder 42 includes a moveable cylinder member, which in the embodiment shown is an inflation shaft 64 that is movably operated within a fixed cylinder member 66 mounted to the fixed frame member 62. Assist cylinders 44, 46 each include moveable cylinder members, which in the embodiment shown are assist shafts 68, 70 affixed to a moveable cross member 71. The assist shafts 68, 70 operate within fixed cylinder members 72, 74 mounted to the fixed frame member 62. FIGS. 5 and 6 illustrate that one end 75 of inflation shaft 64 is secured to the moveable cross member 71 and that the inflation head 40 is mounted to the opposite end 76 of inflation shaft 64. Movement of inflation shaft 64 and assist shafts 68, 70 enables inflation head 40 to be positioned between the retracted position 48 (FIG. 5) and an extended or tire engaging position 50 (FIG. 6).

FIGS. 3A and 4 disclose the inclusion of an anti-rotation tower or brace or guide system 77 that includes a bracket 78 on fixed frame member 62, with bracket 78 including a guide rail 80 within which a guide member 82 of cross member 71 is adapted to travel for guiding movement of cross member 71 and inhibiting rotation of cross member 71 about the longitudinal axis of inflation shaft 64. A single guide system 77 is disclosed in the illustrated embodiment, however, additional guide systems may be employed or an inflation apparatus may be constructed without the inclusion of such a brace. Still further, an alternative guide system may be constructed, for example, as a cylinder having an extendable and retractable shaft.

As shown in FIGS. 3 and 5, a position transducer 84 is mounted to bracket 78 adjacent assist cylinder 44 for monitoring the stroke of inflation shaft 64 and, correspondingly, the position of inflation head 40. Position transducer 84 employs a magnet 86 affixed to moveable cross member 71 such that position transducer 84 is able to supply position information to a control system 88 (FIG. 16) as magnet 86 travels along or adjacent position transducer 84. As described in more detail below, control system 88 is thereby able to accurately monitor and direct the extension and retraction of inflation head 40.

Cross member 71 moves above fixed frame member 62 with assist shafts 68, 70 being extended vertically upwards to place inflation head 40 in the retracted position 48 and retracted into fixed cylinder members 72, 74 to place inflation head 40 in the tire engaging position 50. That is, upward extension of cylinders 44, 46 positions inflation head 40 in the retracted position 48 and retraction of assist cylinders 44, 46 positions inflation head 40 in the tire engaging position 50. The connection of double acting inflation shaft 64 and assist shafts 68, 70 to cross member 71 above fixed frame member 62, along with the relative diameter of inflation shaft 64, provides for extension and retraction of assist shafts 68, 70 to occur without the requirement of guide rods, or the like, being placed or positioned adjacent wheel and tire assembly input location 34, as well as inhibits contamination of shafts 68, 70 by positioning them above the wheel and tire assembly input location 34.

Assist cylinders 44, 46 are hydraulic cylinders, such as may be supplied by the Parker Hannifin Corporation. Inflation cylinder 42 is a double rod hydraulic cylinder in which hydraulic fluid may operate on either side of piston 90 (FIGS. 5 and 6). In the illustrated embodiment, assist cylinders 44, 46 are approximately 2.0 inch diameter cylinders and inflation cylinder 42 is approximately a 10.0 inch diameter cylinder. The size of inflation cylinder 42 provides an inflation shaft 64 able to resist side loads during the inflation process without apparatus 30 requiring lower guide rods or systems depending downward from frame member 62. The connection of assist shafts 68, 70 to moveable cross member 71 enables assist cylinders 44, 46 to be used to move inflation shaft 64 and, thus, inflation head 40. In this manner, lower volumes of pressurized hydraulic fluid may be used to move or reposition inflation head 40 as would be required if inflation cylinder 42 were used to move inflation head 40 up and down due to the relative differences in cylinder sizes. The larger diameter of inflation cylinder 42 may then be used to retain inflation head 40 in a particular position. For example, when placed against a tire in the tire engaging position 50, large upward forces will be exerted on inflation shaft 64 during tire inflation. The larger diameter of inflation cylinder 42 is able to resist the upward force with acceptable hydraulic pressure. It should be appreciated that the relatively lower inflation air pressure in a tire will create a large upward force due to the large cross sectional area of inflation head 40. Thus, the subsequent hydraulic fluid pressure required to retain inflation head 40 in a particular position will be higher due to the smaller cross sectional area of inflation cylinder 42. The pressure in inflation head 42 could, for example, be between 10 to 40 times higher than the tire inflation pressure. The operation and coordination of inflation cylinder 42 and assist cylinders 44, 46 is described in more detail below.

Alternatively, however, more, fewer, differently sized, alternatively configured, or no assist cylinders may be used with a tire inflation apparatus. For example, as illustrated schematically in FIG. 17 and discussed below, alternative assist cylinders may be constructed as pneumatic cylinders. Pneumatic cylinders generally cost less than hydraulic cylinders and also reduce the amount of hydraulic fluid required for a tire inflation apparatus, including reducing the power required to pump the hydraulic fluid by a hydraulic fluid power supply. Further, an alternative tire inflation apparatus may be constructed without assist cylinders wherein the inflation cylinder is used to both move and retain an inflation head. Still further, inflation shafts having larger or smaller diameters may be used based on the tire size to be inflated in accordance with the upward inflation forces being there applied.

Figure 7:
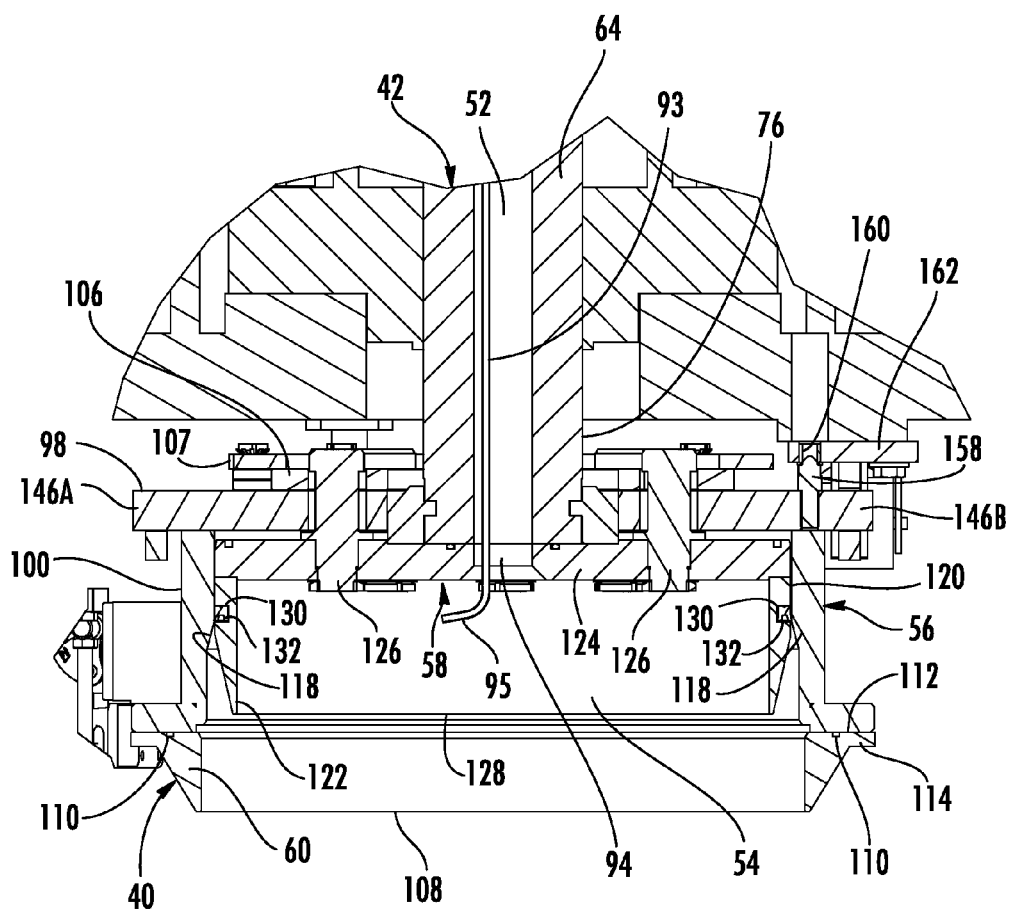
FIG. 7 is an enlarged sectional view of the inflation head of FIG. 5.
Figure 8:
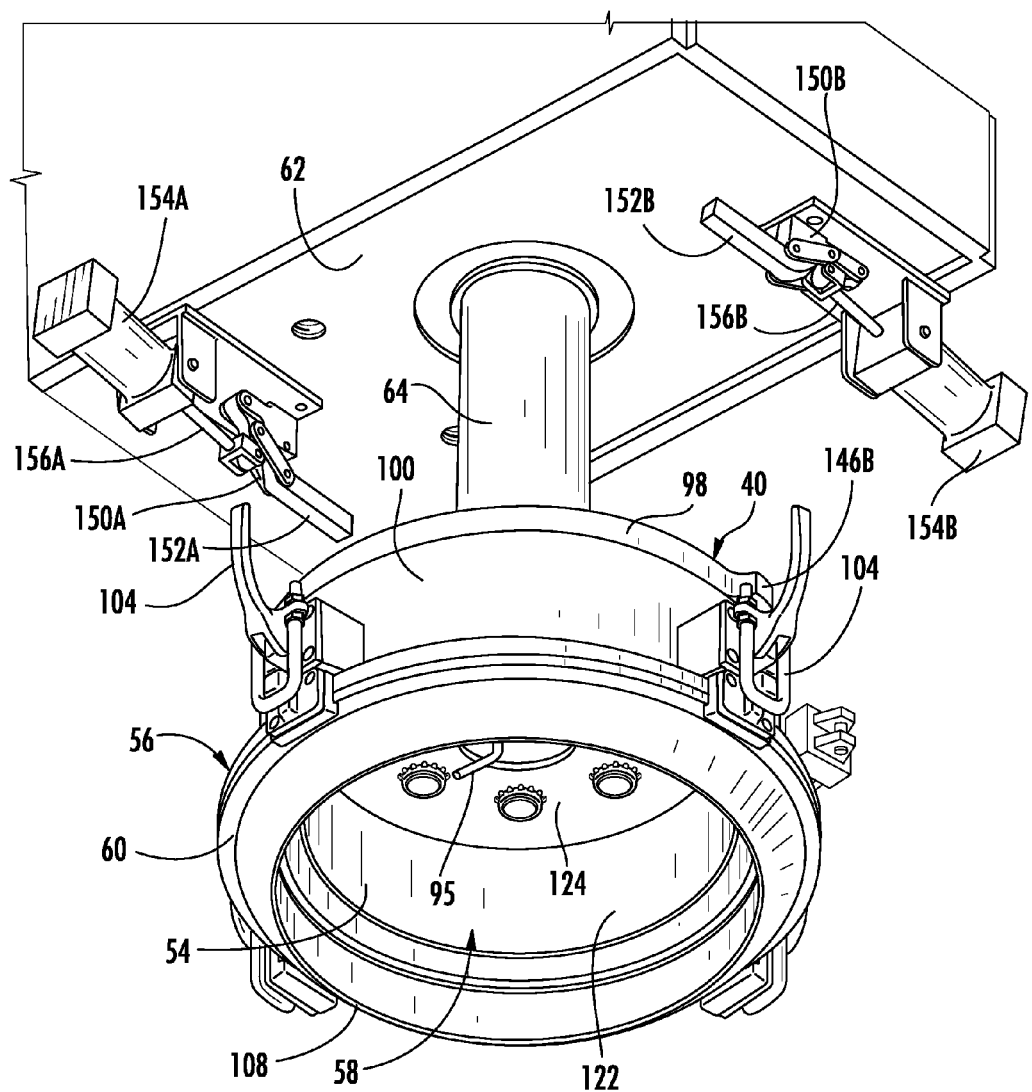
FIG. 8 is an upward perspective view of the inflation head of the tire inflation apparatus of FIG. 1 shown extended from a retracted position.

Referring now to FIG. 7, inflation head 40 is shown to include the previously mentioned inner bell assembly 58 and outer bell assembly 56, and include a tire inflation cavity 54. The inner bell assembly 58 is mounted to the inflation shaft 64, with the inflation shaft 64 including a fluid passage 52 that forms an outlet 94 in the inflation cavity 54. Pressurized gas, such as compressed air, nitrogen, or the like, may be supplied via a line or hose (not shown) affixed to a flange 96 on moveable cross member 71 leading to the fluid passage 52 (FIGS. 5 and 6). Thus, pressurized gas delivered through fluid passage 52 into cavity 54 is used to inflate a tire mounted to a wheel.

As shown in FIGS. 5-7, an elongate hollow tube 93 may be positioned within fluid passage 52 of inflation shaft 64 and affixed to shaft 64 to simultaneously move therewith. Tube 93 includes an angled lower end 95 extending out of and away from outlet 94 of shaft 64, and includes, as shown in FIGS. 6 and 7, an upper end 97 connected to a pressure transmitter or pressure transmitting device 99, with tube 93 and transmitting device 99 thus forming a pressure sensing and transmitting assembly. Although not shown, upper end 97 may pass through a spacer block (not shown) by way of pipe fitting elbows (not shown), with a flange 96 for receiving an air supply hose mounted to the spacer block such that the spacer block is sandwiched between a flange, such as flange 96 of FIGS. 1-3, and cross member 71. Tube 93 enables the inflation or air pressure at cavity 54 to be measured by pressure transmitting device 99 while minimizing the influence of high velocity air filling rate through passage 52. Inflation pressure information monitored by pressure transmitting device 99 may be used to control the setting or operation of inflation apparatus 30. For example, inflation pressure information may be transmitted from pressure transmitting device 99 to a control system, such as control system 88 or 188 described below in connection with FIGS. 16 and 17, with such information being used to control the operation of apparatus 30.

In the illustrated embodiment fluid passage 52 extends the axial length of inflation shaft 64 with pressurized gas being delivered into one end 75 and exiting the opposite end 76 into cavity 54. However, an alternative inflation shaft may have a fluid passage extending only a portion of the length of such an inflation shaft. For example, a fluid passage may be configured as a blind hole or a hole plugged at one end, with pressurized gas being supplied by a hose, tube, or the like, secured to an outer surface of the inflation shaft, such as by a fitting. Still further, an alternative inflation shaft may include more than one fluid passage with the additional fluid passage or passages, for example, be useful for providing control air to other devices inside the inner bell assembly, providing inflation air, or otherwise. An inflation shaft may also be provided with additional passages to allow, for example, wiring to be brought into inner bell assembly for use with other devices, such as pressure monitors, distance or object sensors, or the like.

Figure 6A:
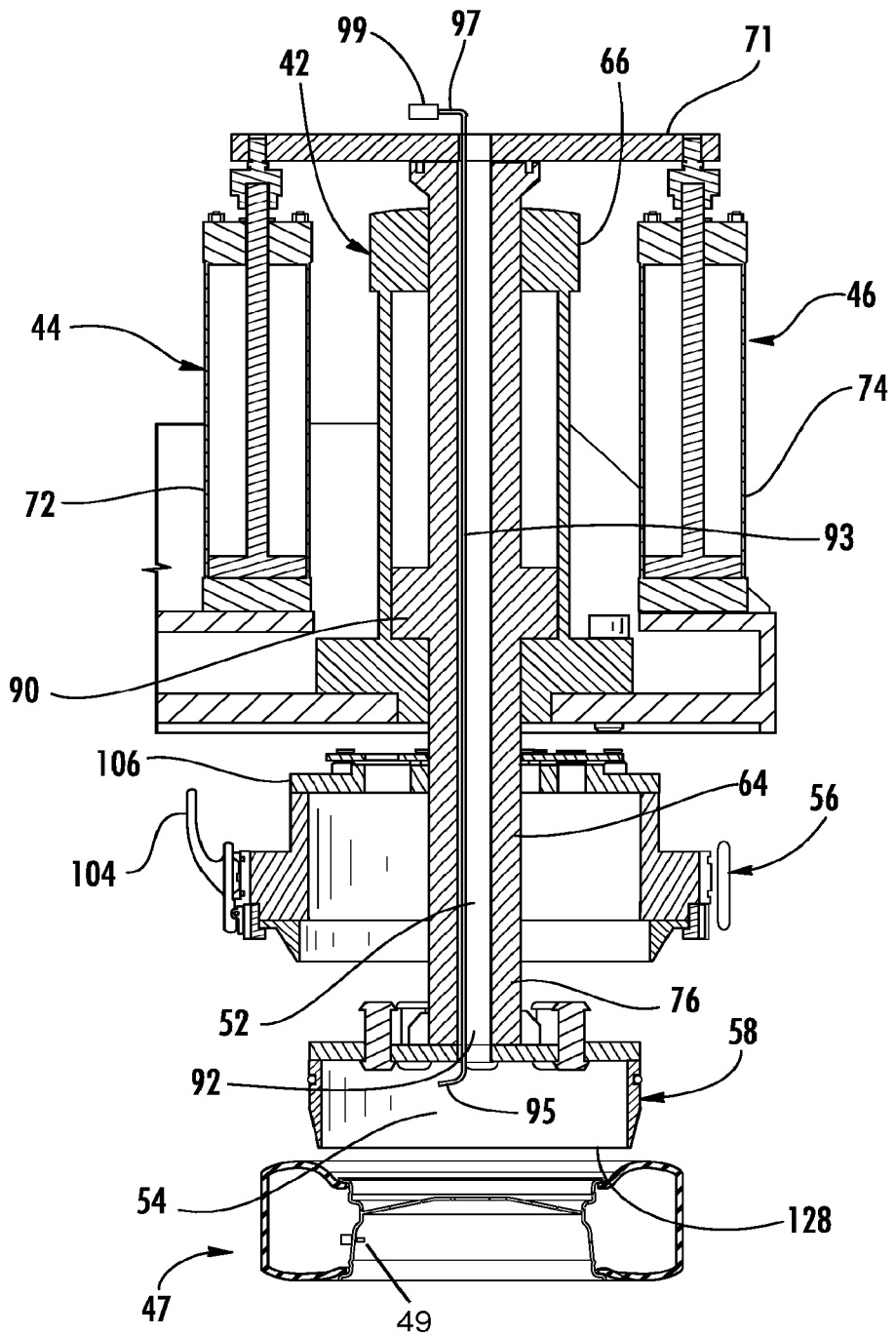
FIG. 6A is a side sectional view of the tire inflation apparatus portion of FIG. 6 showing the inner bell assembly in a tire engaging position and the outer bell assembly detached.

As previously noted, inflation head 40 comprises an outer bell assembly 56 and an inner bell assembly 58. FIGS. 1-8 disclose outer bell assembly 56 affixed to inner bell assembly 58. In this arrangement outer bell assembly 56 is moved up and down with inner bell assembly 58. As understood from FIG. 7, inner bell assembly 58 is nested within outer bell assembly 56 such that outer bell assembly 56 will contact a tire when positioned in the tire engaging position 50. Outer bell assembly 56 may thus be used during the inflation of larger tires and/or wheels, such as tire and wheel assembly 45 of FIG. 6, as compared to inner bell assembly 58, which is shown in FIG. 6A adjacent smaller tire and wheel assembly 47.

Outer bell assembly 56 includes an outer bell top plate 98, an outer bell housing 100 affixed to top plate 98, and ring seal member 60 that is removably attached to housing 100 via clamps 104. An outer bell locking member or locking plate 106 is movably attached to top plate 98 and is retained and sandwiched between top plate 98 and retention member or retention ring 107, with retention ring 107 being secured to top plate 98. Locking plate 106 is used in the engaging and disengaging of outer bell assembly 56 to inner bell assembly 58.

Figure 14:
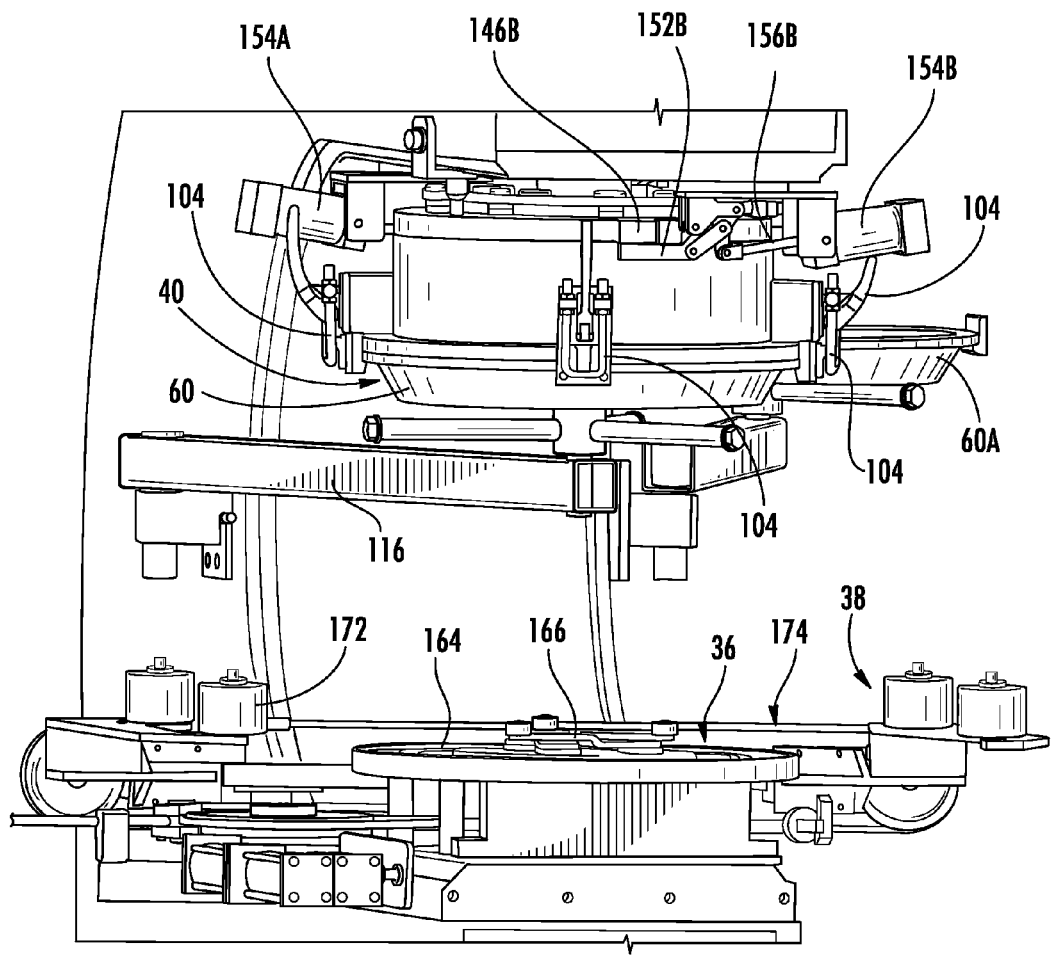
FIG. 14 is side perspective view of the tire inflation apparatus of FIG. 1 illustrating a movable support arm positioned beneath a removable ring seal of the outer bell assembly.

Ring seal member 60 includes a lower circumferential sealing edge 108 that engages and seals against a tire sidewall when inflating a tire assembled to a wheel when the inflation head 40 is positioned in the tire engaging position. Ring seal member 60 further includes a sealing groove 110 within which a seal, such as an o-ring (not shown) may be installed to provide a seal between ring seal member 60 and an attachment face 112 of housing 100. Ring seal member 60 includes an exterior flange 114 that mates with the attachment face 112 whereby clamps 104 are used to secure ring seal member 60 to housing 100. The ability to remove ring seal member 60 enables alternatively sized ring seal members 60A (FIG. 14) to be secured to housing 100. Such alternative ring seal members having circumferential sealing edges defining larger or smaller diameters enable inflation apparatus to inflate still further alternatively sized tires and/or wheel rim assemblies. When not in use, a ring seal member 102 may be stored on a ring member support arm 116 that is pivotally attached to base 32. FIGS. 1, 2, and 14 illustrate a ring member support arm 116 positioned adjacent to outer bell assembly 56 for installing or removing a ring seal member 60. When inflation apparatus 30 is used for inflating tires mounted to wheels, support arm 116 is pivoted out from alignment with inflation head 40.

Outer bell housing 100 includes an internal circumferential chamfer 118 that leads to a circumferential sealing surface 120 against which inner bell assembly 58 is sealed, as described below, to inhibit pressurized gas supplied to cavity 54 from escaping between inner bell assembly 58 and outer bell assembly 56.

Inner bell assembly 58 includes an inner bell housing 122 secured to an inner bell locking plate 124. Multiple locking pins 126 (FIGS. 7 and 12) extend from locking plate 124 and are used in the engagement of inner bell assembly 58 with outer bell assembly 56, as described below. Inner bell housing 122 includes a lower circumferential sealing edge 128 that engages and seals against a tire sidewall when the outer bell assembly 56 is disengaged from the inner bell assembly 58 and the inner bell assembly 58 is positioned in the tire engaging position and used to inflate a tire assembled to a wheel (see FIG. 6A).

An exterior circumferential sealing groove 130 is disposed on housing 122 within which a seal, such as o-ring seal 132, is disposed for sealing against sealing surface 120 of outer bell housing 100. FIG. 7 illustrates inner bell assembly 58 fully nested within outer bell assembly 56 in the arrangement whereby inner and outer bell assemblies 58, 56 are secured and moved together. When outer bell assembly 56 is disengaged from inner bell assembly 58 and inner bell assembly 58 is moved between the retracted position 48 and the tire engaging position 50 independently of outer bell assembly 56, however, inner bell assembly 58 may not be caused to fully nest within outer bell assembly 56. For example, inner bell assembly 58 may only be retracted a distance such that lower sealing edge 128 of inner bell assembly 58 is flush or planar oriented with lower sealing edge 108 of outer bell assembly 56. As such, seal 132 of inner bell assembly 58 is not continuously moved against chamfer 118 and sealing surface 120 of outer bell housing 100, thereby avoiding excessive wear of seal 132.

Figure 10:
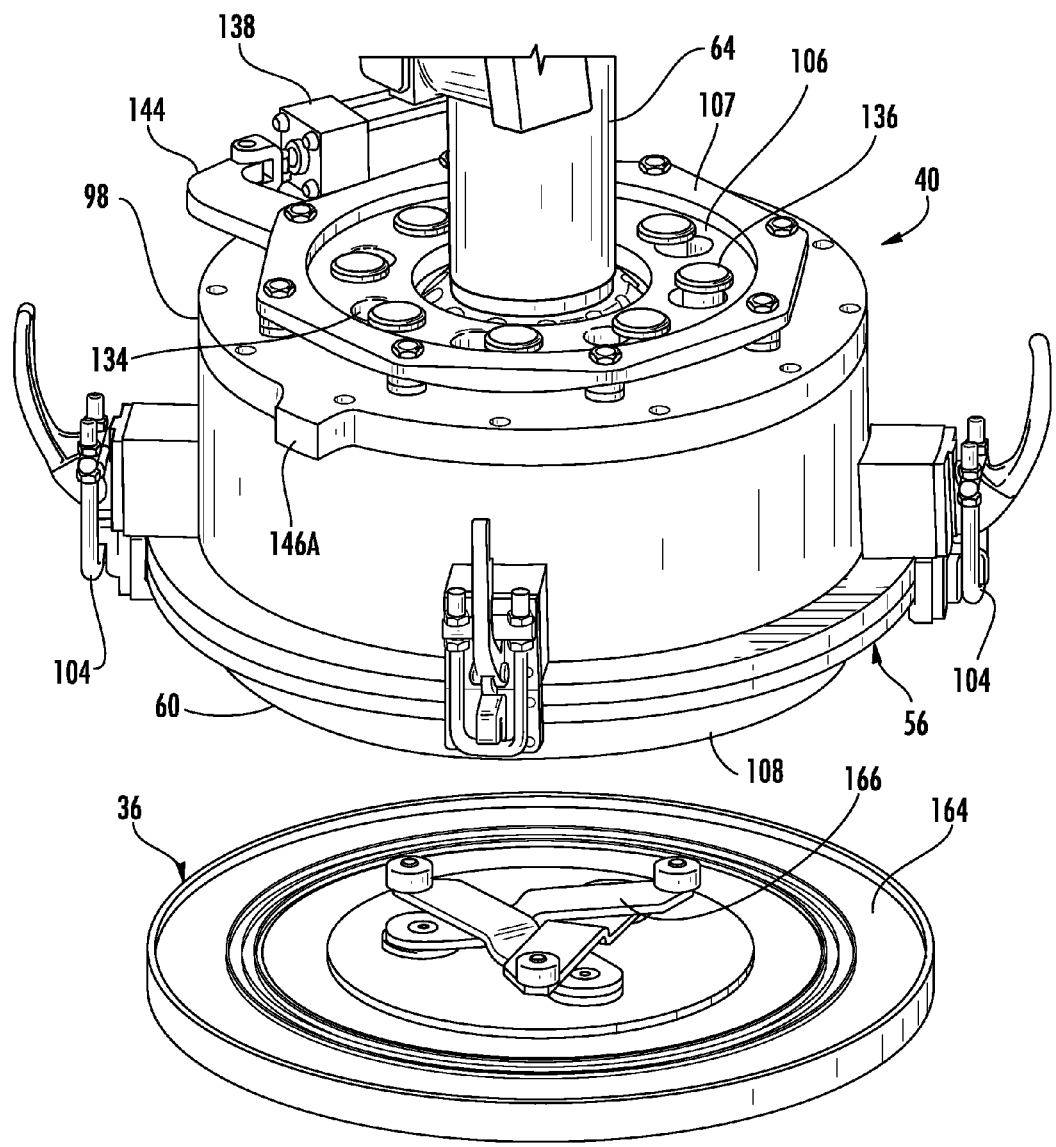
FIG. 10 is a downward perspective view of the inflation head of FIG. 8 illustrating the inner bell assembly and outer bell assembly secured together.
Figure 11:
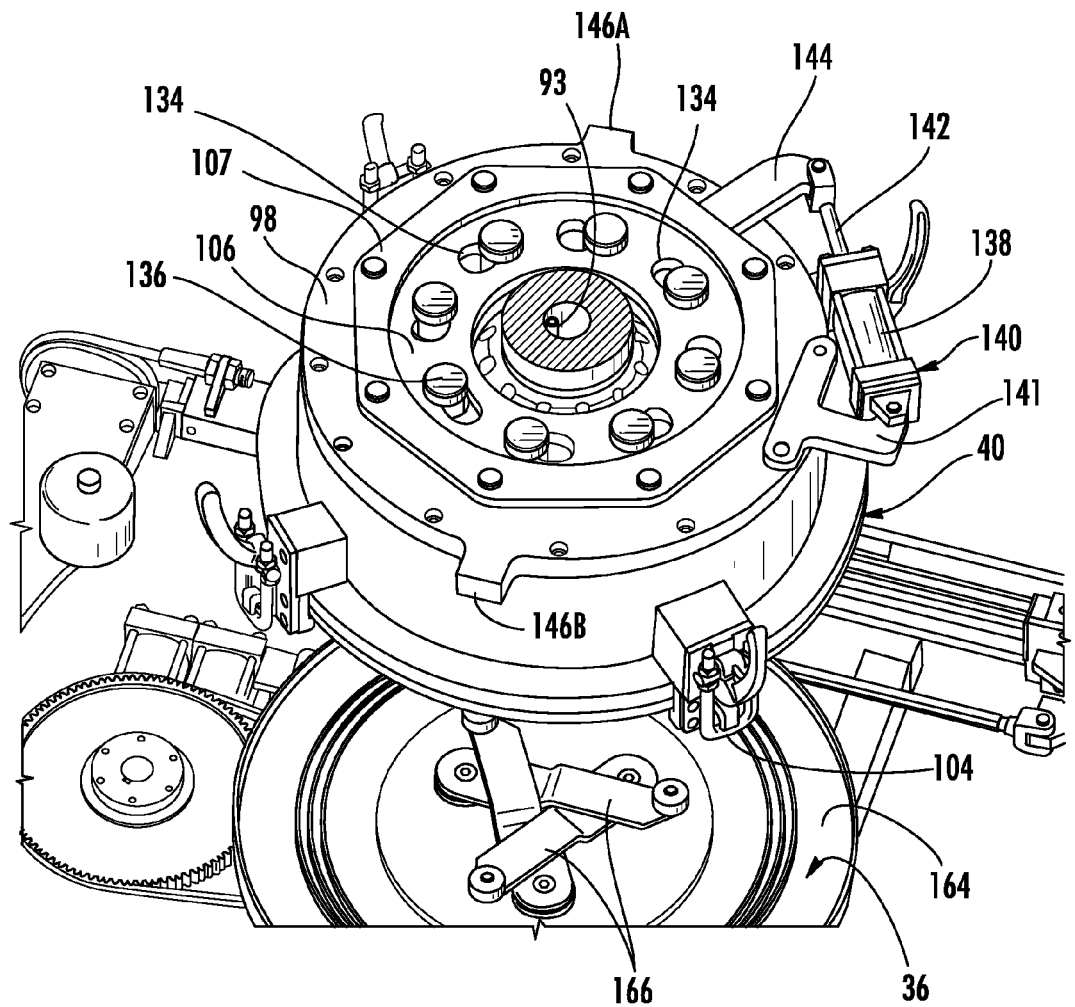
FIG. 11 is a downward partial perspective view of the inflation head of the tire inflation apparatus of FIG. 1 illustrating the inner bell assembly and outer bell assembly unlocked for disengagement.

Referring now to FIGS. 10 and 11, the locking engagement of outer bell assembly 56 to inner bell assembly 58 will now be described. Movable outer bell locking plate 106 includes multiple apertures 134 for receiving the locking pins 126 of inner bell assembly 58. Apertures 134 are formed as elongated holes of overlapping and differing diameters in a keyhole style configuration. Locking pins 126 are constructed with enlarged heads 136 (FIG. 12) that are able to pass through the enlarged portion of apertures 134 (FIG. 11). After heads 136 are passed through the enlarged portion of apertures 134 an actuator, such as cylinder 138, is used to rotate locking plate 106. A base 140 of cylinder 138 is pivotally affixed to outer bell top plate 98 via bracket 141 and the shaft 142 of cylinder 138 is pivotally connected to an arm 144 connected to movable locking plate 106. FIG. 11 illustrates shaft 142 extended whereby heads 136 are able to pass through apertures 134. Subsequently, shaft 142 may be retracted (FIG. 10) such that locking plate 106 is rotated and the smaller portion of apertures 134 are positioned beneath heads 136 whereby outer bell assembly 56 is secured to inner bell assembly 58. Cylinder 138 may be a pneumatic or hydraulic cylinder, or may alternatively be configured as an electric actuator.

Referring now to FIGS. 8, 9 and 11-13, the retention of outer bell assembly 56 to enable inner bell assembly 58 to be operated independently of outer bell assembly 56 will now be described. As understood from FIGS. 9 and 12, outer bell assembly 56 may be retained in the retracted position 48 such that inner bell assembly 58 is able to be extended and retracted independently of outer bell assembly 56.

Figure 9:
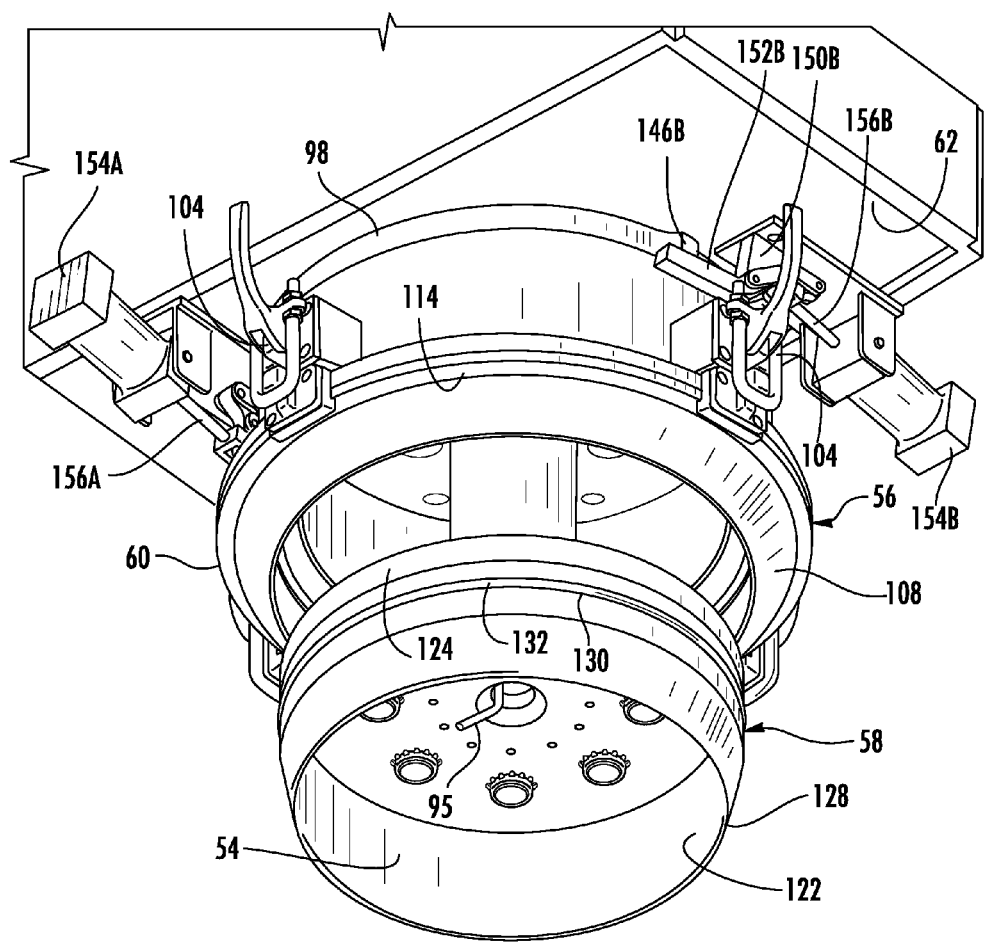
FIG. 9 is an upward perspective view of an outer bell assembly portion of the inflation head of the tire inflation apparatus of FIG. 1 shown in a retracted position and an inner bell assembly portion of the inflation head shown extended from a retracted position.
Figure 12:
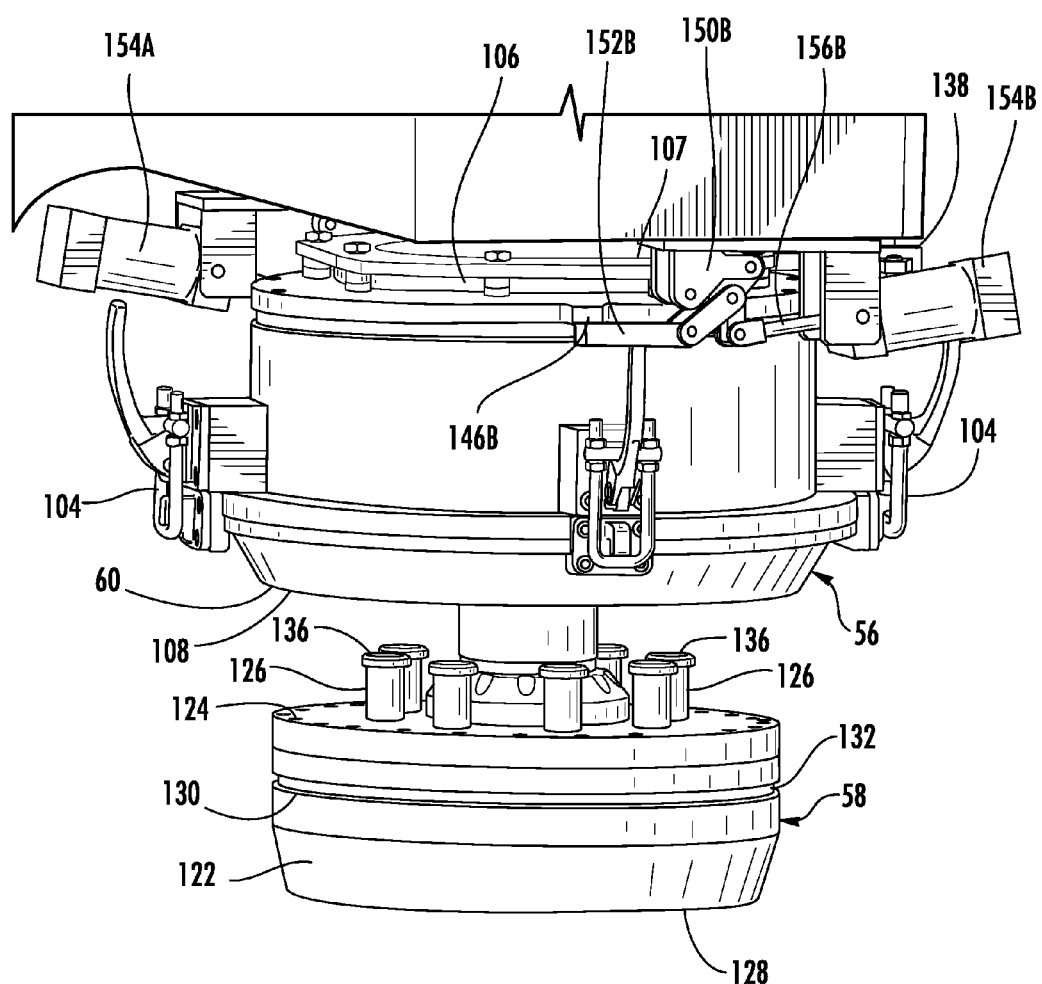
FIG. 12 is a side perspective view of the inflation head of the tire inflation apparatus of FIG. 1 showing the outer bell assembly in a retracted position such that the inner bell assembly is able to move independently of the outer bell assembly.
Figure 13:
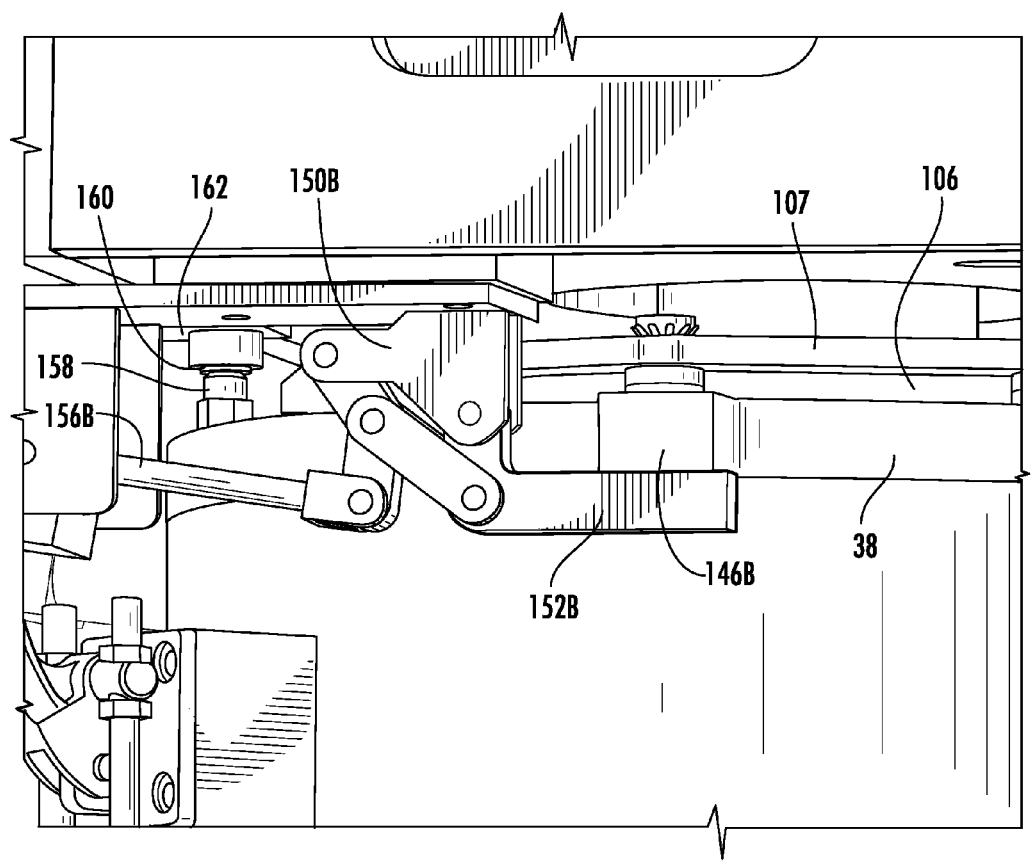
FIG. 13 is a close up perspective view of a portion of the outer bell assembly of FIG. 12 in a retracted position.

Outer bell top plate 98 includes a pair of retention tabs 146A, 146B (FIGS. 7 and 13) disposed generally 180 degrees apart from each other and a pair of retainers mounted to fixed frame member 62 are used to selectively engage tabs 146A, 146B. In the illustrated embodiment, retainers are constructed as clamps 150A, 150B having pivotal L-shaped arms 152A, 152B that are each selectively actuated by a pair of actuators configured as cylinders 154A, 154B. When outer bell assembly 56 is in the retracted position 48, extension of shafts 156A, 156B of cylinders 154A, 154B causes arms 152A, 152B of clamps 150A, 150B to be positioned underneath tabs 146A, 146B (FIGS. 9, 12, and 13). Conventionally, although not shown, retraction of shafts 156 disposes arms 152 in a generally downward pointing direction such that outer bell assembly 56 may be moved in unison with inner bell assembly 58.

FIGS. 7 and 13 further disclose the inclusion of centering buttons or centering pins 158 on outer bell top plate 98. Centering pins 158 are adapted to contact a portion of fixed frame member 62 for accurately locating outer bell assembly 56 against fixed frame member 62 when outer bell assembly 56 is retained in the retracted position 48. In the illustrated embodiment, centering pin 158 is adapted to contact a bushing 160 mounted within a centering pad 162 affixed to fixed frame member 62. Although not shown, three centering pins 158 are provided to locate outer bell assembly 56 against fixed frame member 62. Alternative means of locating outer bell assembly 56 against fixed frame member 62 may be employed and still function as intended within the scope of the present invention. For example, centering pins may directly contact the fixed frame member or alternative retainers used to secure an outer bell assembly may sufficiently locate the outer bell assembly without need for centering pins.

When it is desired to operate inner bell assembly 58 independently of outer bell assembly 56, outer bell assembly 56 is brought into the retracted position 48 such that centering pins 158 engage bushings 160. Clamps 150 are then actuated by cylinders 154 to cause arms 152 to be disposed beneath tabs 146, as shown in FIGS. 9, 12, and 13. Subsequently, movable outer bell locking plate 106 is caused to rotate via cylinder 138 whereby heads 136 of locking pins 126 are disposed at the larger portion of apertures 134 such that inner bell assembly 58 may be disengaged from outer bell assembly 56. Inner bell assembly 58 may then be extended out of outer bell assembly 56. As noted, when inner bell assembly 58 is operated independently of outer bell assembly 56, inner bell assembly 58 does not need to be brought into fully nested engagement with outer bell assembly 56 to inhibit wear of seal 132.

Alternatively configured and/or operated retainer mechanisms may be used to retain outer bell assembly 56 in the retracted position 48 and still function as intended within the scope of the present invention. For example, an outer bell top plate 98 may include more than two retainer tabs, such as disposed 120 degrees about the top plate. Clamps may also be configured with other than L-shaped arms or retainers may be configured other than as clamps. For example, retention pins may be selectively inserted into apertures to hold an outer bell assembly in position.

Although the above described inflation head 40 includes both an inner bell assembly 58 and an outer bell assembly 56, it should be appreciated that a tire inflation apparatus in accordance with aspects of the present invention may include only a single bell assembly, such as, for example, a bell assembly that is generally or substantially similar to inner bell assembly 58.

Figure 15:
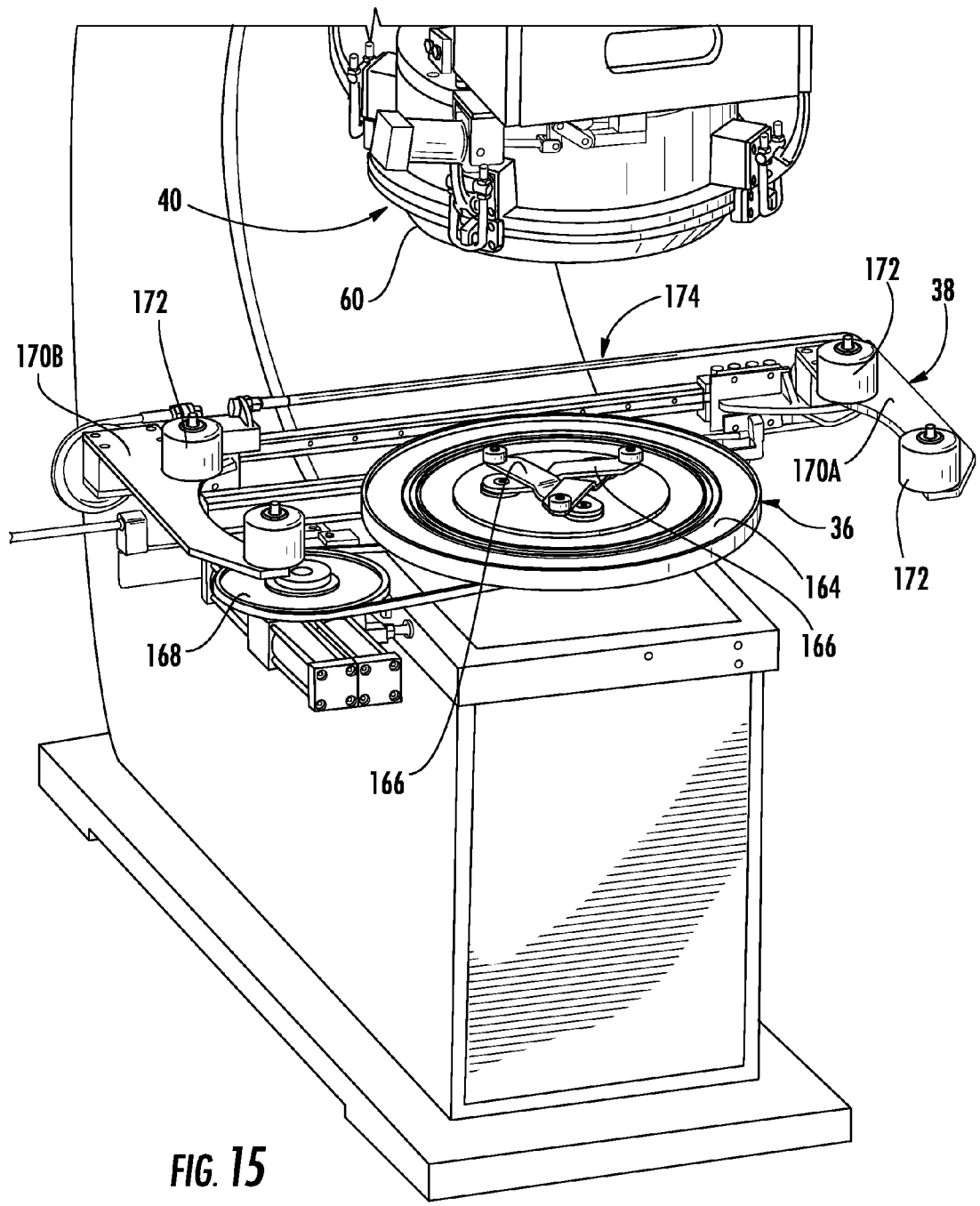
FIG. 15 is a perspective view of the tire and wheel rim locating apparatuses of the tire inflation apparatus of FIG. 1.

As illustrated in FIGS. 1 and 15, a wheel rim centering apparatus 36 and a tire centering apparatus 38 may also be included on inflation apparatus 30. Wheel rim centering apparatus 36 and tire centering apparatus 38 are used to center and hold the rim and tire, respectively, in axial alignment with one another and inflation head 40 prior to engagement of the tire by inflation head 40 for inflating the tire. Although not shown, tire and wheel rim assemblies may be brought to or removed from inflation apparatus 30 by a conveyor system, robotic handling device, or the like.

Wheel rim centering apparatus 36 includes a support plate 164 having three conventional centering arms 166. Each centering arm 166 is connected to an individual centering arm gear (not shown), with each centering arm gear in turn being meshed to a drive gear (also not shown). The drive gear is driven by pulley 168 and when so driven causes centering arms 166 to pivotally move in unison. When a wheel rim is placed on support plate 164, centering arms 166 are outwardly rotated or pivoted in unison to engage an inside diameter, edge, or flange of the rim. When so grasped, the rotational axis of the wheel rim is generally aligned or centered relative to inflation head 40. Tire centering apparatus 38 includes a pair of arms 170A, 170B having tire engaging rollers 172 affixed thereto at spaced positions. Arms 170 are moved in and out in unison by a pulley system 174 and are operated such that inward movement of the arms 170 will align a tire mounted to a rim with inflation head 40.

Figure 16:
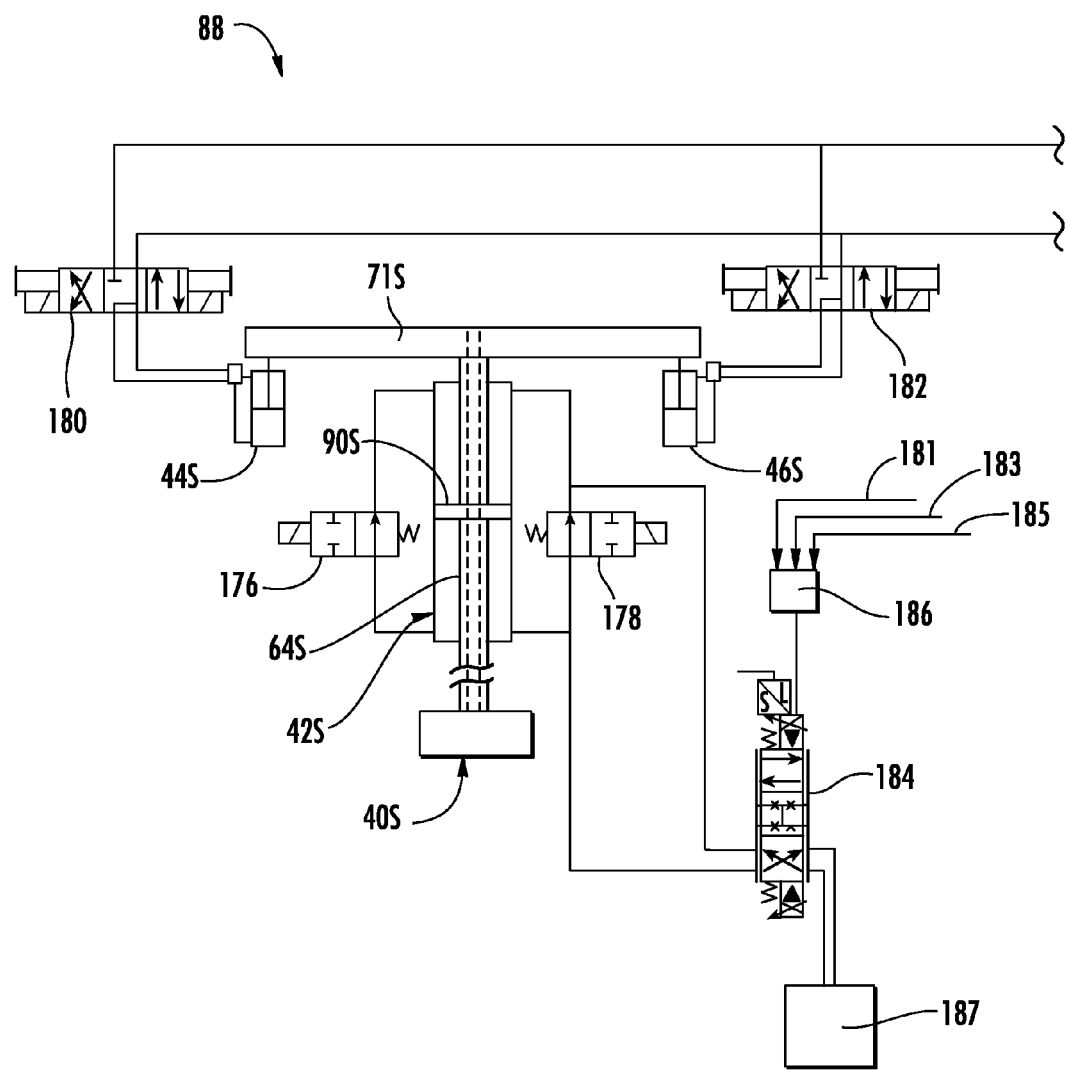
FIG. 16 is a schematic illustration of a hydraulic control system in accordance with the present invention for use with the tire inflation apparatus of FIG. 1.

Control system 88 of inflation apparatus 30 will now be discussed with reference to FIG. 16. Those portions of inflation apparatus 30 illustrated schematically in FIG. 16 are identified using like numbers as used in FIGS. 1-15, with the reference suffix "S" added to the like illustrated parts in FIG. 16. The schematically illustrated components include inflation head 40S, inflation cylinder 42S, inflation shaft 64S, piston 90S assist cylinders 44S, 46S, and moveable cross member 71S.

Control system 88 includes a pair of inflation cylinder valves 176, 178 for controlling operation of inflation cylinder 42S, an assist cylinder valve 180, 182 for each assist cylinder 44S, 46S, respectively, a proportional position control 184, and a controller or processor, such as a PLC or computer 186, or the like. Computer 186 may be pre programmed with information regarding target data for the desired positioning of inflation head 40S to inflate various combinations of tire and wheel assemblies that may be inflated using inflation apparatus 30, along with target tire inflation pressure information.

Valves 176, 178 operate as bypass and lock-up valves for controlling the flow of hydraulic fluid on either side of piston 90S. When inflation head 40S is positioned against a tire in the tire engaging position 50, the valves 176, 178 controlling the flow of hydraulic fluid out of inflation cylinder 42S above and below piston 90S are closed to prevent or inhibit hydraulic fluid from being forced out of inflation cylinder 42S due to the upward forces imparted to inflation shaft 64S during the inflation of the tire. Assist cylinder valves 180, 182 operate to control the flow of hydraulic fluid into and out of assist cylinders 44S, 46S. The extension and retraction of assist cylinders 44S, 46S by hydraulic fluid flowing through assist cylinder valves 180, 182 may be controlled by computer 186 based on input signals discussed below.

Proportional position control 184 is electronically interfaced with computer 186, with computer 186 also receiving input signals 181 from position transducer 84 and input signals 183 from pressure transmitting device 99. Proportional position control 184 is adapted to control the flow of hydraulic fluid into and out of inflation cylinder 42S on either side of piston 90S in response to commands from computer 186 based on input signals 181, 183. Computer 186, thus, is adapted to control the flow of hydraulic fluid into and out of inflation cylinder 42S to provide finer control of the position of inflation head 40S. Computer 186 is able to cause hydraulic fluid supplied from hydraulic power supply 187 to flow through proportional position control 184 when valves 176, 178 are closed. Moreover, computer 186 may additionally or optionally receive input signals 185 from a reading or detecting device (not shown), such as a photo eye, a bar code scanner, vision system, or the like, signaling the presence of a tire and wheel rim at installation apparatus 30 to initiate the process of inflating the assembled tire and wheel rim. Still further, such input signals 185 provided to the computer 186 may additionally provide specifications about the size and/or type of wheel rim and/or tire, whereby computer 186 may further control operation of installation apparatus 30 by controlling the use of either inner bell assembly 58 or outer bell assembly 56 to inflate the tire, or even signaling that an alternative ring seal member 60A may be required to inflate a particular tire and wheel rim assembly based on preprogrammed requirements. The preprogrammed specifications within computer 186 also include tire inflation specifications for the particular tire and wheel assembly to be inflated, with such specifications including the target inflation pressure, as well as specifications for positioning tire inflation head 40 such that the location of the circumferential sealing edge, such as sealing edge 108 or sealing edge 128, is accurately located against the tire sidewall and moved during the inflation process, as described below.

In the illustrated embodiment of FIG. 16, proportional position control 184 is a proportional directional control valve. Alternatively, proportional position control 184 may be a servo hydraulic control valve.

In operation, with inflation head 40S in the retracted position 48, the presence of a tire and wheel assembly, such as assembly 45 or 47, located at the assembly input location 34 is detected, such as by a photo eye, vision system, or the like, or manually by activation of an operator actuated switch, thus transmitting input signal 185 to computer 186. With valves 176, 178 opened, hydraulic fluid is allowed to flow out of assist cylinders 44S, 46S through assist cylinder valves 180, 182 whereby inflation head 40S is lowered into position against the tire and wheel assembly. Position information regarding the location of inflation head 40S is transmitted by position transducer 84 to computer 186. Upon reaching a predetermined target position based on the particular tire and wheel assembly to be inflated, valves 176, 178 may be locked. Computer 186 may subsequently activate the flow of hydraulic fluid through proportional position control 184 to supply additional fluid to inflation cylinder 42S on one side or the other of piston 90S, with a corresponding amount of fluid removed from the opposite side of piston 90S to accurately position inflation head 40S based on the tire and wheel assembly to be inflated. Subsequently, compressed air or the like will be supplied through fluid passage 52 into inflation cavity 54 to inflate the tire. During inflation, control system 88 may continue to monitor and control the position of inflation head 40S. For example, if inflation head 40S is moved upwards due to the inflation pressure, additional hydraulic fluid may be supplied through proportional position control 184 into inflation cylinder 42S to readjust the position of inflation head 40S. Proportional position control 184 may also be used to gradually raise inflation head 40S during the inflation process to coordinate the supplied air pressure through passage 52 to obtain the desired tire inflation pressure. Upon obtaining the desired tire inflation pressure, or upon remaining in position for a predetermined amount of time, valves 176, 178 may be opened to allow hydraulic fluid to flow out of inflation cylinder 42S and hydraulic fluid may be pumped through assist cylinder valves 180, 182 into inflation cylinders 44S, 46S to extend assist shafts 68, 70 and thereby raise inflation head 40S.

An additional feedback parameter for control system 88 may be the measurement of inflation pressure, measured either during inflation such as via pressure transmitting device 99 and/or measured as actual tire inflation pressure post the tire and wheel assembly being inflated by inflation apparatus 30. Input signal 183 supplied by pressure transmitting device 99 to computer 186 may be used by computer 186 to control the supply pressure and/or deactivation of pressurized fluid being supplied into inflation cavity 54. Moreover, the deactivation of the supply of pressurized fluid may be controlled and timed by computer 186 to correspond with upward travel of inflation head 40S to minimize the escape of pressurized fluid from the tire and wheel assembly. One or more pressure transmitting devices may be alternatively located within inflation cavity 54, along fluid passage 52, or upstream thereof.

For example, upon detecting a particular tire and wheel assembly via input signal 185, computer 186 controls the positioning of inflation head 40S via input signal 181 to initially lower circumferential sealing edge, such as sealing edge 108 or sealing edge 128, to depress the upward facing tire sidewall to create a passage for pressurized gas into the tire. Computer 186 then causes the air supply system to supply air through passage 52 and into cavity 54. In conventional manner, a significantly higher supply pressure than the end target tire inflation pressure is initially provided to seat the tire bead of the lower tire sidewall on the wheel. Computer 186 may monitor the air pressure via input signal 183 from pressure transmitting device 99 to confirm that high pressure has been obtained to confine proper seating of the tire bead. Subsequently, computer 186 initiates inflation head 40S to be raised up via proportional position control 184 and the system air pressure supplied is reduced to the desired target tire inflation pressure via input signal 183 from pressure transmitting device 99, with inflation head 40S being raised until the tire bead of the upward facing sidewall is seated on the wheel. Upon detecting the proper inflation pressure and tire bead seat position of inflation head 40S via input signal 181, the supply of pressurized gas through passage 52 is terminated and head 40S may be rapidly raised via valves 176, 178.

Alternatively and/or additionally, tire inflation pressure may be measured after inflation head 40S is removed from a tire and wheel assembly, such as tire and wheel assembly 45 or 47. For example, tire and wheel assemblies may be provided with a tire pressure monitoring (TPM) valve stem 49 (FIGS. 6 and 6A) that is adapted to supply tire pressure data to the vehicle to which it is mounted. Such a TPM valve stem 49 may be used to supply tire inflation pressure of an inflated tire and wheel assembly to computer 186. In response, computer 186 may be used to refine the inflation of tire and wheel assemblies. For example, inflation pressure of pressurized fluid supplied to an assembly at inflation apparatus 30 may be increased or decreased in response to pressure data supplied from a TPM valve stem 49. Additionally and/or alternatively, the positioning of inflation head 40S and/or the duration inflation head 40S is maintained in the tire engaging position 50 may be adjusted in response to such data. For example, inflation head 40S may be positioned lower and/or remain in contact with the tire and wheel assembly longer in order to increase tire pressure in the assembled tire and wheel assembly.

Figure 17:
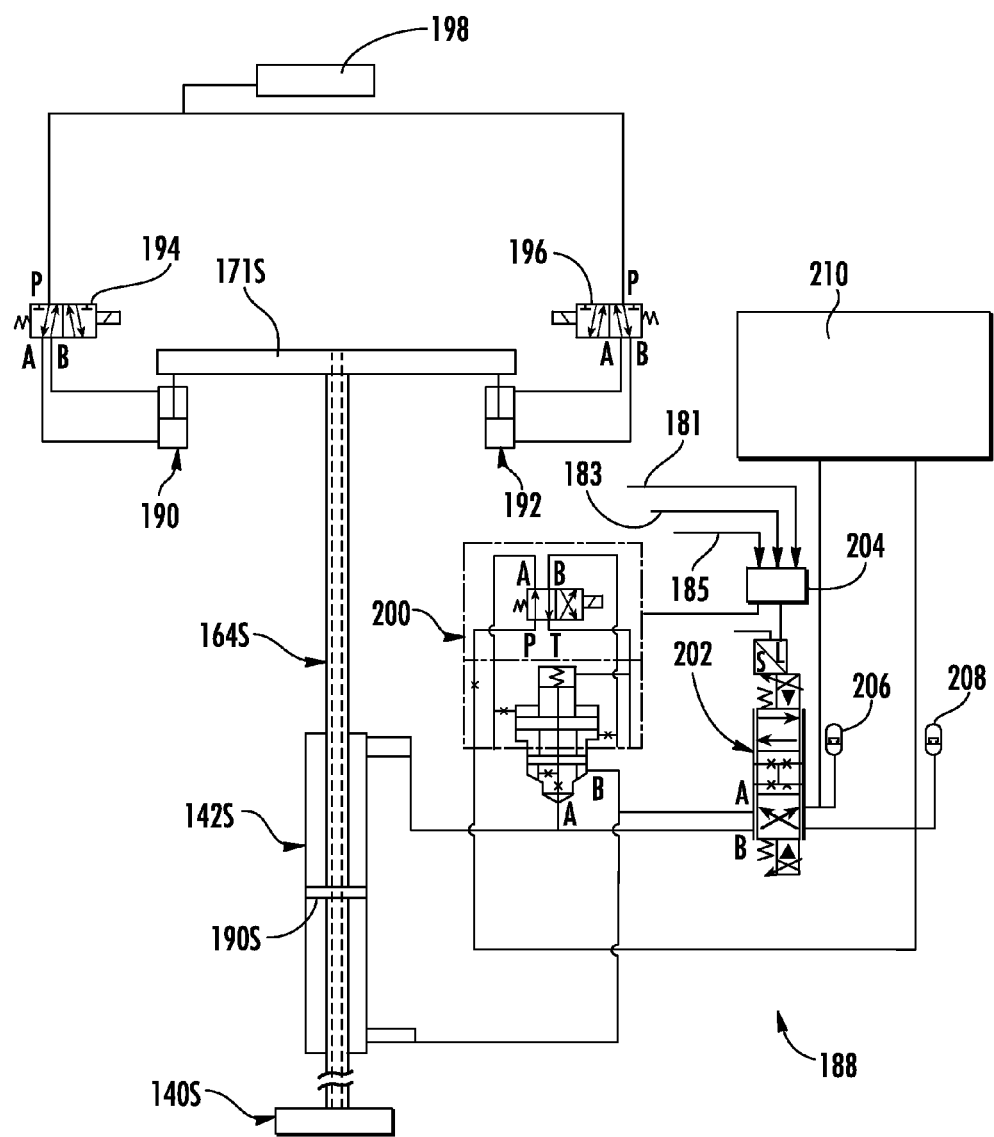
FIG. 17 is a schematic illustration of an alternative hydraulic control system in accordance with the present invention for use with a tire inflation apparatus.

Referring now to FIG. 17, an alternative embodiment of a control system 188 for use with a tire inflation apparatus is disclosed, wherein the assist cylinders 190, 192 of the tire inflation apparatus are constructed as pneumatic cylinders. Those portions of the inflation apparatus illustrated schematically in FIG. 17 corresponding with illustrated parts of FIGS. 1-15 are identified using like numbers as used in FIGS. 1-15, with 100 and the reference suffix "S" added to the like illustrated parts in FIG. 17. Those schematically illustrated components include an inflation head 140S, inflation cylinder 142S, inflation shaft 164S, piston 190S, and moveable cross member 171S.

Control system 188 includes directional valves 194, 196 tied to pressurized gas source 198, which in the illustrated embodiment is compressed air such as may be supplied by a shop air system. Control system 188 also includes a bypass and lock up valve 200, a proportional position control 202, which in the illustrated embodiment is a proportional directional control valve, and a controller or processor, such as computer 204, or the like. Computer 204 interfaces and controls valves 200 and 202, as well as may receive input signals 181 from position transducer 84, input signals 183 from pressure transmitting device 99, and input signals 185 indicative of the presence and/or configuration of a tire and wheel assembly to be inflated. Control system 188 operates in substantially similar manner as control system 88 regarding operating the inflation process based on input signals 181, 183, and 185, as such the specifics regarding inflation head positioning and pressure monitoring will not be discussed in detail relative to control system 188.

Valve 200 is also a proportional flow control valve, which in the illustrated embodiment is a DIN cartridge valve, such as may be supplied by the Parker Hannifin Corp., having an integrated position transducer for monitoring the position of the internal valve spool that controls the flow rate of valve 200, with valve 200 being sized based on the flow requirements necessary for the size tire and wheel assemblies to be inflated by apparatus 30. The proportional flow of valve 200 enables rapid movement of inflation head 140S when valve 200 is fully opened, but provides finer positional control of inflation head 140S when flow is restricted from valve 200. When valve 200 is opened, hydraulic fluid is able to flow from one end of inflation cylinder 142S to the other on either side of piston 190S to allow inflation shaft 164S to be rapidly extended and retracted to position the attached inflation head 140S in either a retracted position or the tire engaging position. As the target up or down position of inflation head 140S is reached as monitored via position transducer 84 and input signal 181, the flow rate of valve 200 is lowered by computer 204 to slow the travel rate of inflation head 140S to thereby accurately control the stopping position of inflation head 140S. Upon valve 200 being closed with inflation head 140S in the tire engaging position, inflation cylinder 142S is able to resist the upward force exerted on inflation shaft 164S by the inflation of a tire and wheel assembly.

Valve 200 may also be controlled via computer 204 to enable inflation head 140S to be raised during the inflation operation after the initial overpressure to seat the lower tire bead. That is, to enable inflation head 140S to be raised while the system pressure is reduced to the target tire inflation pressure until the tire bead of the upward facing sidewall has been seated. Accordingly, control system 188 may be alternatively operated without proportional position control 202. Control system 188 further includes a safety feature via valve 200. If power to control system 188 is lost, downward movement of inflation head 140S via the weight of inflation head 140S will be resisted via the discharge of hydraulic fluid from cylinder 142S into valve 200 to provide a dead head flow condition.

Proportional position control 202 also operates in generally like manner to proportional position control 184 of control system 88 to optionally provide finer position control of inflation head 140S. Position transducer 84 of inflation apparatus 30, monitors position of the inflation head 140S, such as by way of movement of moveable cross member 171S. The position information from the position transducer is transmitted to computer 204, which in turn is able to activate proportional position control 202 to supply hydraulic fluid to inflation cylinder 142S and provide finer positioning of the inflation head 140S as may be necessary. The use of accumulators 206, 208 enables the flow average to be leveled and permits a smaller hydraulic power supply to be used for the fine positioning of inflation head. Hydraulic fluid is supplied to the control system 188 by hydraulic power supply 210.

Pneumatic assist cylinders 190, 192 operate to move inflation head 140S by acting on cross member 171S. For example, when inflation head 140S is positioned in a tire engaging position and valve 200 is substantially locked against significant movement, pressurized air from pressure source 198 is supplied through directional valves 194, 196 into assist cylinders 190, 192 such that assist cylinders 190, 192 are pre-charged to exert an upward force on cross member 171S. When valve 200 is opened upon the completion of the inflation of a tire and wheel assembly, such as assembly 45 or 47, assist cylinders 190, 192 subsequently drive inflation head 142S upward. Valve 200 is then again locked when inflation head 142S reaches the desired position in the retracted position. While valve 200 is locked with inflation head 142S in the retracted position, assist cylinders may again be recharged by pressure source 198 to exert an opposite force on cross member 171S and, when valve 200 is reopened, assist cylinders can then drive inflation head 140S into the tire engaging position. Directional valves 194, 196 of assist cylinders 190, 192 may also be controlled by computer 204.

Control systems 88 and 188 thus provide closed loop control of the position of the inflation head 40 of inflation apparatus 30 via active hydraulic control, as well as control based on inflation pressure and tire and wheel assembly parameters. Control systems 88 and/or 188 may alternatively be used to monitor and control the operation of alternative tire inflation apparatuses, and an inflation head 40 mounted to inflation shaft 42 of head positioning cylinder 42 may also be operated by a conventional hydraulic circuit or system, and may include conventionally operated assist cylinders as well, and still function as intended.

In the illustrated embodiment fixed frame member 62 is secured to base 32. It should be appreciated that alternative arrangements of fixed frame member, either with or without a base, may be employed and still enable a tire inflation apparatus to function as intended within the scope of the present invention. For example, a fixed frame member may not be unitarily attached to the structure whereat the assembled wheel rim and tire are held for inflation of the tire by the inflation apparatus. Such an arrangement may be achieved by forming the fixed frame member with overhead frame work independent of, for example, a conveyor system or line along which assembled wheel rims and tires are conveyed.

The tire inflation apparatus may be used as a standalone machine or operation, or may alternatively be incorporated into an assembly line or assembly cell. For example, although not shown, tire inflation apparatus 30 may be positioned adjacent a conveyor with mechanisms provided for transferring tire and wheel assemblies from the conveyor for inflation and back to the conveyor upon being inflated. Still further, a conveyance system may be constructed to directly transport tire and wheel assemblies beneath the inflation head. A robotic insertion and removal device may also be employed for loading and unloading tire and wheel assemblies from tire inflation apparatus 30.

An embodiment of the tire inflation apparatus in accordance with the present invention positions an inflation cylinder and assist cylinders above the inflation head and pressurized gas is delivered to the inflation head through a fluid passageway formed in the shaft of the inflation cylinder. An inner and an outer bell assembly comprise the inflation head, with the outer bell assembly being selectively and readily attachable and detachable from the inner bell assembly. When detached from the inner bell assembly, the outer bell assembly is retainable in a non-extended position such that the inner bell assembly may be moved independently. The inflation apparatus inhibits debris and contamination from disrupting the operation of the inflation head, provides a shorter height, and requires less power to operate. Moreover, the elimination of guide rods adjacent the wheel and tire assembly input location provides greater access to the assembly input location, thereby enabling greater flexibility in the manufacturing process. The inflation apparatus further enables differently sized wheel and tire combinations to be conveniently inflated without time consuming equipment changes. The inflation apparatus also simplifies the delivery of pressurized gas to a tire for inflation.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A tire inflation system for inflating a tire mounted on a rim, said inflation system comprising:
 a tire inflation apparatus having an inflation head, a pressurized gas source, and a controller, said inflation head being positioned at a tire and wheel assembly inflation location at which a tire and wheel assembly is received to inflate said tire and wheel assembly, said tire and wheel assembly including a tire pressure monitoring (TPM) valve stem with said TPM valve stem detecting and transmitting inflation pressure data of said tire and wheel assembly;
 said inflation head defining a tire inflation cavity and adapted to form a seal with the tire of said tire and wheel assembly when the tire of said tire and wheel assembly contacts said inflation head with said tire inflation cavity including an outlet through which pressurized gas is delivered from said pressurized gas source for inflation of said tire and wheel assembly;
 said controller operatively receiving inflation pressure data of said tire and wheel assembly from said TPM valve stem and controlling operation of said tire inflation apparatus in response thereto;

wherein said controller operatively adjusts the delivery of the pressurized gas by said tire inflation apparatus in response to inflation pressure data of said tire and wheel assembly received from said TPM valve stem, and wherein said controller receives inflation pressure data of said tire and wheel assembly from said TPM valve stem after said tire and wheel assembly has been inflated, with said controller adjusting the delivery of the pressurized gas by said tire inflation apparatus to a subsequent tire and wheel assembly positioned at said tire and wheel assembly inflation location.

2. The tire inflation system of claim 1, wherein said tire inflation apparatus further comprises:
a head position cylinder including a fixed head position cylinder base and a moveable inflation shaft, said inflation head being mounted to said inflation shaft whereby movement of said inflation shaft selectively positions said inflation head between a retracted position and a tire engaging position, with said inflation head being positioned against said tire and wheel assembly in said tire engaging position;
a position gauge, said position gauge operatively detecting the position of said inflation head, said controller being operatively connected with said position gauge such that said controller receives position information of said inflation head;
a position control valve, said position control valve operatively connected with said controller and adapted to control movement of said inflation head;
wherein said controller operates said position control valve to direct movement of said inflation head in response to position information of said inflation head received from said position gauge.

3. The tire inflation system of claim 2, wherein said controller operatively adjusts the duration said inflation head is in said tire engaging position based on inflation pressure data received from said TPM valve stem.

4. The tire inflation system of claim 3, wherein said controller receives inflation pressure data of said tire and wheel assembly from said TPM valve stem after said tire and wheel assembly has been inflated, with said controller adjusting the duration said inflation head is in said tire engaging position based on inflation pressure data received from said TPM valve stem for a subsequent tire and wheel assembly positioned at said tire and wheel assembly inflation location.

5. The tire inflation system of claim 2, wherein said controller operatively adjusts the length said inflation shaft is extended based on inflation pressure data received from said TPM valve stem.

6. The tire inflation system of claim 5, wherein said controller receives inflation pressure data of said tire and wheel assembly from said TPM valve stem after said tire and wheel assembly has been inflated, with said controller adjusting the length said inflation shaft is extended based on inflation pressure data received from said TPM valve stem for a subsequent tire and wheel assembly positioned at said tire and wheel assembly inflation location.

7. The tire inflation system of claim 2, wherein said head position cylinder comprises a hydraulic cylinder and said inflation shaft includes a piston inside said fixed head position cylinder base, and wherein said position control valve comprises a hydraulic proportional flow control valve adapted to supply and remove hydraulic fluid from both sides of said piston.

8. The tire inflation system of claim 2, wherein said inflation shaft includes a fluid passage extending at least partially through said inflation shaft, said fluid passage forming said outlet in said tire inflation cavity such that pressurized gas is deliverable through said fluid passage to said tire inflation cavity to inflate said tire and wheel assembly when said inflation head is sealed against the tire in said tire engaging position.

9. The tire inflation system of claim 8, further including a tube positioned within said fluid passage with an end of said tube positioned at said tire inflation cavity and including a pressure transmitting device, said pressure transmitting device being mounted to said tube and operable to monitor pressure at said tire inflation cavity and transmit input signals indicative of the pressure at said tire inflation cavity to said controller, and wherein said controller is additionally adapted to operate said inflation apparatus in response to said input signals.

10. The tire inflation system of claim 2, wherein said tire inflation apparatus further includes a frame member positioned above said tire and wheel assembly inflation location, a first assist cylinder and a second assist cylinder mounted to said frame member above said inflation location, said first assist cylinder including a fixed first assist cylinder base and a moveable first assist shaft and said second assist cylinder including a fixed second assist cylinder base and a moveable second assist shaft;
said moveable first assist shaft and said moveable second assist shaft being operatively connected to said inflation shaft by a moveable cross member with said head position cylinder, said first assist cylinder, and said second assist cylinder cooperatively operating to selectively position said inflation head, said inflation head being positioned in said retracted position by vertical upward extension of said moveable first assist shaft from said fixed first assist cylinder base and upward extension of said moveable second assist shaft from said fixed second assist cylinder base and positioned in said tire engaging position by vertical downward retraction of said moveable first assist shaft into said fixed first assist cylinder base and vertical downward retraction of said moveable second assist shaft into said fixed second assist cylinder base, and wherein said moveable cross member is positioned and moveable vertically above said frame member with said fixed first assist cylinder base, said fixed second assist cylinder base, and said fixed head position cylinder base mounted to said frame member, and wherein said inflation shaft includes a lower portion extending and retracting vertically downward from said fixed head position cylinder base and an upper portion extending and retracting vertically upward from said fixed head position cylinder base, and wherein said upper portion of said inflation shaft is connected to said moveable cross member.

11. The tire inflation system of claim 1, further including a pressure transmitting device operative to monitor pressure at said tire inflation cavity and transmit input signals indicative of the pressure at said tire inflation cavity to said controller, and wherein said controller is additionally adapted to operate said inflation apparatus in response to said input signals.

12. A method of inflating tire and wheel assemblies having tire pressure monitoring (TPM) valve stems, said method comprising:
positioning a tire and wheel assembly at an inflation location of a tire inflation apparatus, with the tire inflation apparatus including an inflation head, a pressurized gas source and a controller;
engaging the inflation head with the tire and wheel assembly to form a seal with the tire of the tire and wheel assembly;

inflating the tire and wheel assembly with the pressurized gas source while the inflation head is in engagement with the tire and wheel assembly;

measuring inflation pressure data of the tire and wheel assembly with the TPM valve stem of the tire and wheel assembly after said inflating the tire and wheel assembly with the pressurized gas source;

transmitting the inflation pressure data to the controller of the tire inflation apparatus; and controlling operation of the tire inflation apparatus for inflating subsequent tire and wheel assemblies based on the inflation pressure data, and wherein said controlling operation of the tire inflation apparatus based on the inflation pressure data comprises adjusting the delivery of the pressurized gas delivered by the tire inflation apparatus.

13. The method of claim 12, wherein said controlling operation of the tire inflation apparatus based on inflation pressure data comprises adjusting the duration the tire and wheel assembly is in engagement with the inflation head during said engaging the inflation head with the tire and wheel assembly to form a seal with the tire of the tire and wheel assembly.

14. The method of claim 12, wherein said controlling operation of the tire inflation apparatus based on inflation pressure data comprises adjusting the amount of engagement between the tire and wheel assembly and the inflation head during said engaging the inflation head with the tire and wheel assembly to form a seal with the tire of the tire and wheel assembly.

15. A tire inflation system for inflating a tire mounted on a rim, said inflation system comprising:

a tire inflation apparatus having a controller and an inflation head through which pressurized gas is delivered, said inflation head being positioned at a tire and wheel assembly inflation location at which tire and wheel assemblies having tire pressure monitoring (TPM) valve stems are selectively received for inflation, with the TPM valve stems operable to measure the inflation pressure of its associated tire and wheel assembly;

said inflation head defining a tire inflation cavity and adapted to form a seal with the tire of a tire and wheel assembly when the inflation head contacts the tire, and with said tire inflation cavity including an outlet through which pressurized gas is delivered for inflation of the tire and wheel assembly;

said controller operatively receiving inflation pressure data of a tire and wheel assembly from its associated TPM valve stem and controlling operation of said tire inflation apparatus in response thereto, wherein said controller receives said inflation pressure data from the TPM valve stem of the tire and wheel assembly after the tire and wheel assembly has been inflated, with said controller operable to adjust the operation of said tire inflation apparatus on a subsequent tire and wheel assembly positioned at said tire and wheel assembly inflation location.

* * * * *